United States Patent [19]

Kanno

[11] Patent Number: 5,835,892
[45] Date of Patent: Nov. 10, 1998

[54] METHOD AND APPARATUS FOR EXPANDING SIMILAR CHARACTER STRINGS

[75] Inventor: Yuji Kanno, Tokyo, Japan

[73] Assignee: Matsushita Electric Industrial Co., Ltd., Osaka, Japan

[21] Appl. No.: 626,108

[22] Filed: Apr. 3, 1996

[30] Foreign Application Priority Data

Jun. 12, 1995 [JP] Japan .................................. 7-144726

[51] Int. Cl.[6] ...................................................... G10L 9/00
[52] U.S. Cl. ......................... 704/257; 704/251; 704/252; 704/253; 704/9; 379/88
[58] Field of Search .................. 704/9, 8, 257, 704/251, 252–256; 379/88

[56] References Cited

U.S. PATENT DOCUMENTS

| | | | |
|---|---|---|---|
| 3,952,184 | 4/1976 | Bassard . | |
| 5,138,669 | 8/1992 | Shimura et al. | 382/229 |
| 5,255,310 | 10/1993 | Kim et al. | 379/88 |
| 5,357,431 | 10/1994 | Nakada et al. | 707/531 |
| 5,388,234 | 2/1995 | Kanno et al. | 711/220 |
| 5,452,451 | 9/1995 | Akizawa et al. | 707/6 |
| 5,495,409 | 2/1996 | Kanno | 364/184 |
| 5,680,612 | 10/1997 | Asada et al. | 395/613 |
| 5,706,496 | 1/1998 | Noguchi et al. | 395/603 |

FOREIGN PATENT DOCUMENTS

| | | | |
|---|---|---|---|
| 5-073536 | 3/1993 | Japan . | |
| 6-149791 | 5/1994 | Japan . | |
| 7-200615 | 8/1995 | Japan | G06F 17/30 |

OTHER PUBLICATIONS

Japanese ISBN4–8271–9334–8, "Trademark Examination Standards" by the Trademark Division of the Japanese Patent Office, published by the Patent Association pp. 116–127.

"Formal Languages and their Relations to Automata" by Hopcroft et al, Addison–Weslay, pp. 8–45, 1969.

"Formal Languages" by Salomaa, Academic Press, pp.8–45, 1969.

"Computer Processing System in the Japanese Patent Office" Information management vol. 22, No. 1, Apr. 1979; by Kazuo Ubukata.

Primary Examiner—David R. Hudspeth
Assistant Examiner—Vijay B. Chawan
Attorney, Agent, or Firm—Lowe Hauptman Gopstein Gilman & Berner

[57] ABSTRACT

A table of derivation elements and a state-transition table indicating applicable strings of derivation types are produced according to pronunciation expanding rules in a similar character string expanding apparatus. Each of the derivation elements is composed of a derived sound derived from a key sound placed at a key position of a question pronunciation character string, a sound position of the derived sound in each of character strings expanded from the question pronunciation character string and one or more derivation types indicating how the derived sound placed at the sound position is derived from the key sound placed at the key position. In a character string retrieving apparatus, strings of derivation types are produced one by one by arranging derivation types of the table of derivation elements in order of the sound position, and it is judged whether or not each of the strings of derivation types agrees with one of the applicable strings to judge whether or not each of the strings of derivation types satisfies the pronunciation expanding rules. Thereafter, trademark numbers corresponding to the strings of derivation types satisfying the pronunciation expanding rules are retrieved. Therefore, because any character strings similar in pronunciation to the question pronunciation character string is not directly used, the trademark numbers indicating trademarks similar to the question pronunciation character string can be retrieved at high speed.

36 Claims, 24 Drawing Sheets

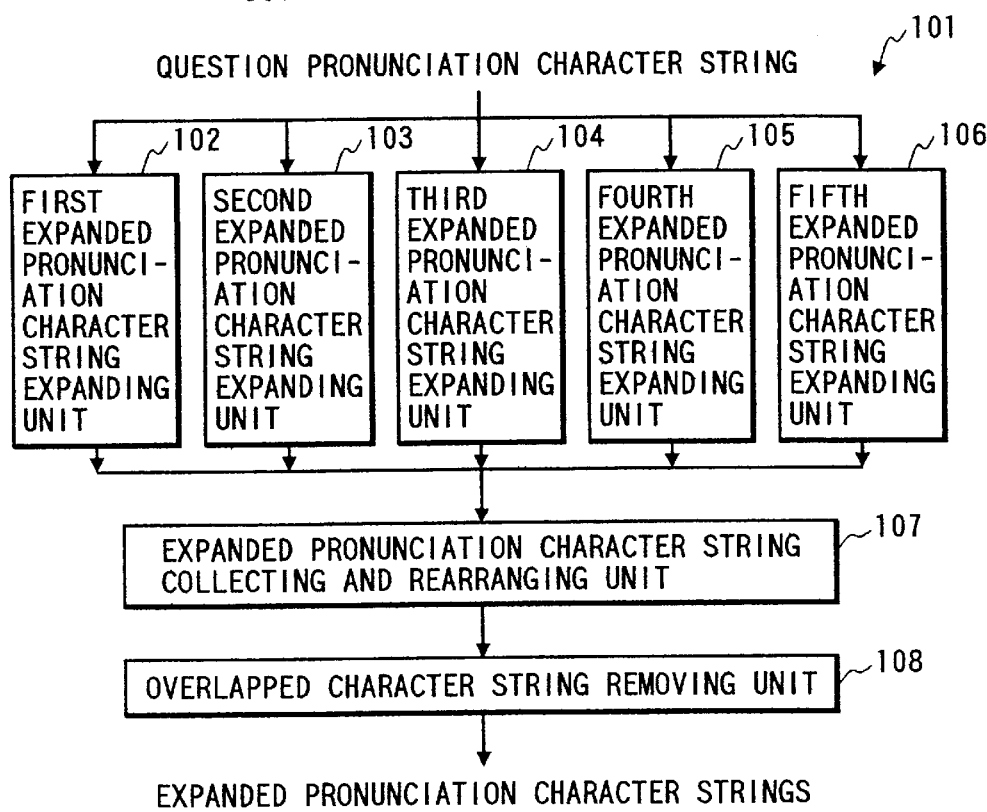

FIG. 3
PRIOR ART

A PAIR OF PRONUNCIATION CHARACTER STRINGS OF WORDS ARE SIMILAR TO EACH OTHER WHEN THE PRONUNCIATION CHARACTER STRINGS ARE THE SAME IN PRONUNCIATION ON CONDITION THAT ONE OF FOLLOWING DIFFERENCES IS NOT CONSIDERED AS A PRONUNCIATION DIFFERENCE.

S1 ; DIFFERENCE BETWEEN EXISTENCE OF A WEAK SOUND "NA", "NU" OR "RU" IN A POSITION OF A WORD EXCEPT FOR A TOP POSITION AND NO EXISTENCE OF ANY WEAK SOUND.
(EXAMPLE) "NA-SHI" AND "NA-SHI-RU"

S2 ; TWO SOUNDS OF TWO PRONUNCIATION CHARACTER STRINGS PLACED AT THE SAME POSITION BELONG TO A WEAK SOUND GROUP "NA", "NU", "RU".
(EXAMPLE) "NA-SHI" AND "NU-SHI"

S3 ; TWO SOUNDS OF TWO PRONUNCIATION CHARACTER STRINGS PLACED AT THE SAME POSITION BELONG TO A SAME SOUND LINE OF JAPANESE SYLLABARY.
(EXAMPLE) "NA-SHO-NA-RU" AND "NA-SHO-NU-RU"

S4 ; COMBINATION OF TWO DIFFERENCES NO.2 AND NO.3. WHEN THE NUMBER OF SOUNDS IN EACH PRONUNCIATION CHARACTER STRING IS EQUAL TO OR MORE THAN FIVE.
(EXAMPLE) "PA-NA-SO-NI-KKU" AND "PA-NU-SO-NE-KKU"

FIG. 4
PRIOR ART

EXPANDED PRONUNCIATION CHARACTER STRINGS SIMILAR IN PRONUNCIATION TO A QUESTION PRONUNCIATION CHARACTER STRING ARE PRODUCED BY APPLYING ONE OF FIVE PRONUNCIATION EXPANDING RULES.

NO. 1 ; WHEN QUESTION PRONUNCIATION CHARACTER STRING HAVING TWO OR MORE SOUNDS HAS A WEAK SOUND "NA", "NU" OR "RU" AT A POSITION EXCEPT FOR A TOP POSITION, A CHARACTER STRING IS PRODUCED BY DELETING THE WEAK SOUND.
    (EXAMPLE) EXPANDED PRONUNCIATION CHARACTER STRINGS "NA-SHI-RU" AND "NA-SHI-NU" PRODUCED FROM "NA-SHI-NU-RU"

NO. 2 ; ONE WEAK SOUND "NA", "NU" OR "RU" IS INSERTED AFTER SECOND OR FOLLOWING SOUND OF QUESTION PRONUNCIATION CHARACTER STRING.
    (EXAMPLE) "NA-NA-SHI", "NA-NU-SHI", "NA-RU-SHI", "NA-SHI-NA", "NA-SHI-NU" AND "NA-SHI-RU" PRODUCED FROM "NA-SHI"

NO. 3 ; ONE WEAK SOUND "NA", "NU" OR "RU" IS REPLACED WITH ANOTHER WEAK SOUND "NA", "NU" OR "RU".
    (EXAMPLE) "NU-SHI-NU", "RU-SHI-NU", "NA-SHI-NA" AND "NA-SHI-RU" PRODUCED FROM "NA-SHI-NU"

NO. 4 ; ONE SOUND IS REPLACED WITH ANOTHER SOUND OF THE SAME SOUND LINE.
    (EXAMPLE) "NI-SHI", "NU-SHI", "NE-SHI", "NO-SHI", "NA-SA", "NA-SU", "NA-SE" AND "NA-SO" PRODUCED FROM "NA-SHI"

NO. 5 ; ONE SOUND OF QUESTION PRONUNCIATION CHARACTER STRING HAVING FIVE OR MORE SOUNDS IS REPLACED WITH ANOTHER SOUND OF THE SAME SOUND LINE. IN ADDITION, THE RULE NO. 3 IS APPLIED.
    (EXAMPLE) "PI-NU-SO-NI-KKU" PRODUCED FROM "PA-NA-SO-NI-KKU"

FIG. 6
PRIOR ART

| TRADEMARK NUMBERS | PRONUNCIATION CHARACTER STRINGS |
|---|---|
| 1100347 | "NA – SHI – { – }" |
| 1100347 | "NA – SHI – { – } – N" |
| 1100371 | "NI – SHO – NA – RU – N" |
| 1100359 | "NA – SHO – NA" |
| 1100359 | "NA – SHO – N – A" |
| 1100359 | "NA – SHO – N" |
| 1101022 | "NA – SHO – NA – RA" |
| 1101022 | "NA – SHO – NA" |
| 1101492 | "NI – SHO – NA – RU – { – } – RU" |
| 1101492 | "NI – SHO – NA – RU – { – }" |
| 1101492 | "NI – SHO – NA – RU" |
| 1102069 | "A – SHA – NA – RU" |
| 1102069 | "A – { – } – SHA – NU – RU" |
| 1102148 | "NA – SHO – NU – SHO – NA – RA" |
| 1102148 | "NA – SHO – NU – SHO – NA – RA – { – }" |
| 1102148 | "NA – SHI – { – } – NU – SHO – NA – RA" |
| 1102148 | "NA – SHI – { – } – NU – SHO – NA – RA – { – }" |
| 1106430 | "NI – SHO – NA – RU" |
| 1113044 | "NA – SHA – NA – RU" |
| 1113271 | "NA – SHI – { – } – N" |

{ – } FUNCTIONS TO CHANGE A SHORT VOWEL "SHI" TO A LONG VOWEL "SHI – { – }"

FIG. 7
PRIOR ART

| TRADEMARK NUMBERS | PRONUNCIATION CHARACTER STRINGS |
|---|---|
| 1102069 | "A – { – } – SHA – NU – RU" |
| 1102069 | "A – SHA – NU – RU" |
| 1100347 | "NA – SHI – { – }" |
| 1102148 | "NA – SHI – { – } – NU – SHO – NA – RA" |
| 1102148 | "NA – SHI – { – } – NU – SHO – NA – RA – { – }" |
| 1100347 | "NA – SHI – { – } – N" |
| 1113271 | "NA – SHI – { – } – N" |
| 1113044 | "NA – SHA – NA – RU" |
| 1100359 | "NA – SHO – NA" |
| 1101022 | "NA – SHO – NA" |
| 1101022 | "NA – SHO – NA – RA" |
| 1102148 | "NA – SHO – NU – SHO – NA – RA" |
| 1102148 | "NA – SHO – NU – SHO – NA – RA – { – }" |
| 1100359 | "NA – SHO – N" |
| 1100359 | "NA – SHO – N – A" |
| 1101492 | "NI – SHO – NA – RU" |
| 1106430 | "NI – SHO – NA – RU" |
| 1101492 | "NI – SHO – NA – RU – { – }" |
| 1101492 | "NI – SHO – NA – RU – { – } – RU" |
| 1100371 | "NI – SHO – NA – RU – N" |

FIG. 8
PRIOR ART

| PRONUNCIATION NUMBERS | PRONUNCIATION CHARACTER STRINGS |
|---|---|
| 1 | "A – { – } – SHA – NU – RU" |
| 2 | "A – SHA – NU – RU" |
| 3 | "NA – SHI – { – }" |
| 4 | "NA – SHI – { – } – NU – SHO – NA – RA" |
| 5 | "NA – SHI – { – } – NU – SHO – NA – RA – { – }" |
| 6 | "NA – SHI – { – } – N" |
| 7 | "NA – SHA – NA – RU" |
| 8 | "NA – SHO – NA" |
| 9 | "NA – SHO – NA – RA" |
| 10 | "NA – SHO – NU – SHO – NA – RA" |
| 11 | "NA – SHO – NU – SHO – NA – RA – { – }" |
| 12 | "NA – SHO – N" |
| 13 | "NA – SHO – N – A" |
| 14 | "NI – SHO – NA – RU" |
| 15 | "NI – SHO – NA – RU – { – }" |
| 16 | "NI – SHO – NA – RU – { – } – RU" |
| 17 | "NI – SHO – NA – RU – N" |

FIG. 9
PRIOR ART

| PRONUNCIATION NUMBERS | TRADEMARK NUMBERS |
|---|---|
| 1 | 1102069 |
| 2 | 1102069 |
| 3 | 1100347 |
| 4 | 1102148 |
| 5 | 1102148 |
| 6 | 1100347, 1113271 |
| 7 | 1113044 |
| 8 | 1100359, 1101022 |
| 9 | 1101022 |
| 10 | 1102148 |
| 11 | 1102148 |
| 12 | 1100359 |
| 13 | 1100359 |
| 14 | 1101492, 1106430 |
| 15 | 1101492 |
| 16 | 1101492 |
| 17 | 1100371 |

FIG. 12

DERIVATIVE CONSTRAINT: Y = J (ONE OF WEAK SOUNDS LISTED IN WEAK SOUND TABLE j0 IS PLACED AT A NEXT POSITION OF A THIRD POSITION AT WHICH "NA" IS PLACED.)

QUESTION PRONUNCIATION CHARACTER STRING : NA - SHO - NA - RU

SIMILAR SOUND TABLE: XX = d0

(ONE OF SOUNDS LISTED IN SAME-LINE SOUND TABLE d0 IS DERIVED FROM THE SOUND "NA")

EXPANDED PRONUNCIATION CHARACTER STRING : NA - SHO - {-} - NO

THE NUMBER OF SHIFTED SOUNDS: ZZ = +1

(SOUND "NO" IS DERIVED AT A FOURTH POSITION)

CONCLUSION:

"NA-SHO-NA-RU" ⟶ "NA-SHO-{-}-NO"

DERIVATION TYPE <d0J+1>

DERIVATIVE CONSTRAINT
J = +0j0+1

FIG. 13A

| KEY SOUNDS | SAME SOUND TABLE s0 | WEAK SOUND TABLE j0 | WEAK DIFFERENT SOUND TABLE j1 | SAME-LINE SOUND TABLE d0 |
|---|---|---|---|---|
| A | A | NA, NU, RU | | I, U, E, O |
| I | I | NA, NU, RU | | A, U, E, O |
| U | U | NA, NU, RU | | A, I, E, O |
| E | E | NA, NU, RU | | A, I, U, O |
| O | O | NA, NU, RU | | A, I, U, E |
| KA | KA | NA, NU, RU | | KI, KU, KE, KO |
| KI | KI | NA, NU, RU | | KA, KU, KE, KO |
| KU | KU | NA, NU, RU | | KA, KI, KE, KO |
| KE | KE | NA, NU, RU | | KA, KI, KU, KO |
| KO | KO | NA, NU, RU | | KA, KI, KU, KE |
| SA | SA | NA, NU, RU | | SHI, SU, SE, SO |
| SHI | SHI | NA, NU, RU | | SA, SU, SE, SO |
| SU | SU | NA, NU, RU | | SA, SHI, SE, SO |
| SE | SE | NA, NU, RU | | SA, SHI, SU, SO |
| SO | SO | NA, NU, RU | | SA, SHI, SU, SE |
| TA | TA | NA, NU, RU | | CHI, TSU, TE, TO |
| CHI | CHI | NA, NU, RU | | TA, TSU, TE, TO |
| TSU | TSU | NA, NU, RU | | TA, CHI, TE, TO |
| TE | TE | NA, NU, RU | | TA, CHI, TSU, TO |
| TO | TO | NA, NU, RU | | TA, CHI, TSU, TE |
| NA | NA | NA, NU, RU | NU, RU | NI, NU, NE, NO |
| NI | NI | NA, NU, RU | | NA, NU, NE, NO |
| NU | NU | NA, NU, RU | NA, RU | NA, NI, NE, NO |
| NE | NE | NA, NU, RU | | NA, NI, NU, NO |
| NO | NO | NA, NU, RU | | NA, NI, NU, NE |
| HA | HA | NA, NU, RU | | HI, FU, HE, HO |
| HI | HI | NA, NU, RU | | HA, FU, HE, HO |
| FU | FU | NA, NU, RU | | HA, HI, HE, HO |
| HE | HE | NA, NU, RU | | HA, HI, FU, HO |
| HO | HO | NA, NU, RU | | HA, HI, FU, HE |
| MA | MA | NA, NU, RU | | MI, MU, ME, MO |
| MI | MI | NA, NU, RU | | MA, MU, ME, MO |
| MU | MU | NA, NU, RU | | MA, MI, ME, MO |
| ME | ME | NA, NU, RU | | MA, MI, MU, MO |
| MO | MO | NA, NU, RU | | MA, MI, MU, ME |

FIG. 13B

| KEY SOUNDS | SAME SOUND TABLE s0 | WEAK SOUND TABLE j0 | WEAK DIFFERENT SOUND TABLE j1 | SAME-LINE SOUND TABLE d0 |
|---|---|---|---|---|
| YA | YA | NA, NU, RU | | YU, YO |
| YU | YU | NA, NU, RU | | YA, YO |
| YO | YO | NA, NU, RU | | YA, YU |
| RA | RA | NA, NU, RU | | RI, RU, RE, RO |
| RI | RI | NA, NU, RU | | RA, RU, RE, RO |
| RU | RU | NA, NU, RU | NA, NU | RA, RI, RE, RO |
| RE | RE | NA, NU, RU | | RA, RI, RU, RO |
| RO | RO | NA, NU, RU | | RA, RI, RU, RE |
| WA | WA | NA, NU, RU | | |
| N | N | NA, NU, RU | | |
| GA | GA | NA, NU, RU | | GI, GU, GE, GO |
| GI | GI | NA, NU, RU | | GA, GU, GE, GO |
| GU | GU | NA, NU, RU | | GA, GI, GE, GO |
| GE | GE | NA, NU, RU | | GA, GI, GU, GO |
| GO | GO | NA, NU, RU | | GA, GI, GU, GE |
| ZA | ZA | NA, NU, RU | | JI, ZU, ZE, ZO |
| JI | JI | NA, NU, RU | | ZA, ZU, ZE, ZO |
| ZU | ZU | NA, NU, RU | | ZA, JI, ZE, ZO |
| ZE | ZE | NA, NU, RU | | ZA, JI, ZU, ZO |
| ZO | ZO | NA, NU, RU | | ZA, JI, ZU, ZE |
| DA | DA | NA, NU, RU | | DE, DO |
| DE | DE | NA, NU, RU | | DA, DO |
| DO | DO | NA, NU, RU | | DA, DE |
| BA | BA | NA, NU, RU | | BI, BU, BE, BO |
| BI | BI | NA, NU, RU | | BA, BU, BE, BO |
| BU | BU | NA, NU, RU | | BA, BI, BE, BO |
| BE | BE | NA, NU, RU | | BA, BI, BU, BO |
| BO | BO | NA, NU, RU | | BA, BI, BU, BE |
| PA | PA | NA, NU, RU | | PI, PU, PE, PO |
| PI | PI | NA, NU, RU | | PA, PU, PE, PO |
| PU | PU | NA, NU, RU | | PA, PI, PE, PO |
| PE | PE | NA, NU, RU | | PA, PI, PU, PO |
| PO | PO | NA, NU, RU | | PA, PI, PU, PE |

FIG. 13C

| KEY SOUNDS | SAME SOUND TABLE s0 | WEAK SOUND TABLE j0 | WEAK DIFFERENT SOUND TABLE j1 | SAME-LINE SOUND TABLE d0 |
|---|---|---|---|---|
| KYA | KYA | NA, NU, RU | | KYU, KYO |
| KYU | KYU | NA, NU, RU | | KYA, KYO |
| KYO | KYO | NA, NU, RU | | KYA, KYU |
| SHA | SHA | NA, NU, RU | | SYU, SYO |
| SHU | SHU | NA, NU, RU | | SYA, SYO |
| SHO | SHO | NA, NU, RU | | SYA, SYU |
| CHA | CHA | NA, NU, RU | | CHU, CHO |
| CHU | CHU | NA, NU, RU | | CHY, CHO |
| CHO | CHO | NA, NU, RU | | CHY, CHU |
| HYA | HYA | NA, NU, RU | | HYU, HYO |
| HYU | HYU | NA, NU, RU | | HYA, HYO |
| HYO | HYO | NA, NU, RU | | HYA, HYU |
| MYA | MYA | NA, NU, RU | | MYU, MYO |
| MYU | MYU | NA, NU, RU | | MYA, MYO |
| MYO | MYO | NA, NU, RU | | MYA, MYU |
| RYA | RYA | NA, NU, RU | | RYU, RYO |
| RYU | RYU | NA, NU, RU | | RYA, RYO |
| RYO | RYO | NA, NU, RU | | RYA, RYU |
| GYA | GYA | NA, NU, RU | | GYU, GYO |
| GYU | GYU | NA, NU, RU | | GYA, GYO |
| GYO | GYO | NA, NU, RU | | GYA, GYU |
| JA | JA | NA, NU, RU | | JU, JO |
| JU | JU | NA, NU, RU | | JA, JO |
| JO | JO | NA, NU, RU | | JA, JU |
| BYA | BYA | NA, NU, RU | | BYU, BYO |
| BYU | BYU | NA, NU, RU | | BYA, BYO |
| BYO | BYO | NA, NU, RU | | BYA, BYU |
| PYA | PYA | NA, NU, RU | | PYU, PYO |
| PYU | PYU | NA, NU, RU | | PYA, PYO |
| PYO | PYO | NA, NU, RU | | PYA, PYU |
| * | * | NA, NU, RU | | |
| {-} | {-} | NA, NU, RU | | |

\* DOUBLE CONSONANT
{-} EQUIVALENT TO MACRON

FIG. 14

1. CONTENTS OF STRINGS OF PARTICULAR DERIVATION TYPES

A SOUND PLACED AT A POSITION RANGING FROM SECOND POSITION TO TENTH POSITION IN AN EXPANDED PRONUNCIATION CHARACTER STRING IS DERIVED ACCORDING TO A DERIVATION TYPE <d00+0>, AND ANOTHER OR OTHER SOUNDS ARE DERIVED ACCORDING TO ONE OR MORE DERIVATION TYPES <s00+0>. IN THIS CASE, <d00+0> IS PLACED AT A POSITION OF A STRING EXCEPT FOR A TOP POSITION, <s00+0> ARE PLACED AT ANOTHER OR OTHER POSITIONS, AND THE NUMBER OF DERIVATION TYPES IN THE STRING RANGES FROM 2 TO 10.

2. EXAMPLES OF STRINGS OF PARTICULAR DERIVATION TYPES

<s00+0> <d00+0>
   <s00+0> <s00+0> <d00+0>
   <s00+0> <d00+0> <s00+0>
   <s00+0> <s00+0> <s00+0> <d00+0>
   <s00+0> <s00+0> <d00+0> <s00+0>
   <s00+0> <d00+0> <s00+0> <s00+0>
   .
   .
   .

3. REGULAR EXPRESSION INDICATING STRINGS OF PARTICULAR DERIVATION TYPES AND APPLICABLE RANGE OF THE NUMBER OF SOUNDS IN AN EXPANDED PRONUNCIATION CHARACTER STRING 2-10, <s00+0> <s00+0>* <d00+0> <s00+0>*

4. INTERPRETATION OF THE REGULAR EXPRESSION AND THE ALLOWABLE RANGE

<s00+0> IS FIRST ARRANGED AT A TOP POSITION,
   ZERO OR MORE <s00+0> IS/ARE ARRANGED AT FOLLOWING POSITION(S),
   <d00+0> IS ARRANGED,
   ZERO OR MORE <s00+0> IS/ARE ARRANGED AT FOLLOWING POSITION(S), AND
   THE NUMBER OF PARTICULAR DERIVATION TYPES IN THE STRING RANGES FROM 2 TO 10.

FIG. 16A

PRONUNCIATION EXPANDING RULE R1
(CLASSIFICATION NUMBER 1)
(INTERPRETATION)
    CHARACTER STRING IS PRODUCED BY DELETING A SOUND
    PLACED AT A POSITION OTHER THAN A TOP POSITION IN A
    QUESTION PRONUNCIATION CHARACTER STRING HAVING TWO OR
    MORE SOUNDS WHEN THE SOUND IS LISTED IN THE WEAK
    SOUND TABLE j0.
(CORRESPONDING PRONUNCIATION SIMILARITY CRITERION) S1
(APPLICABLE RANGE OF THE NUMBER OF SOUNDS) 2~10
(CHANGE IN THE NUMBER OF SOUNDS) −1
(REGULAR EXPRESSION) <s00+0>* <s0J+0> <s00−1>*
(EXAMPLE) "NA-SHI-RU" AND "NA-SHI-NU" ARE PRODUCED
        FROM "NA-SHI-NU-RU"

PRONUNCIATION EXPANDING RULE R2
(CLASSIFICATION NUMBER 1)
(INTERPRETATION)
    CHARACTER STRING IS PRODUCED BY INSERTING A SOUND
    LISTED IN THE WEAK SOUND TABLE j0 AT A POSITION OTHER
    THAN A TOP POSITION OF A QUESTION PRONUNCIATION
    CHARACTER STRING
(CORRESPONDING PRONUNCIATION SIMILARITY CRITERION) S1
(APPLICABLE RANGE OF THE NUMBER OF SOUNDS) 1~9
(CHANGE IN THE NUMBER OF SOUNDS) +1
(REGULAR EXPRESSION) <s00+0> <s00+0>* <j00+1> <s00+1>*
(EXAMPLE) "NA-NA-SHI", "NA-NU-SHI", "NA-RU-SHI",
        "NA-SHI-NA", "NA-SHI-NU" AND "NA-SHI-RU" ARE
        PRODUCED FROM "NA-SHI".

PRONUNCIATION EXPANDING RULE R3
(CLASSIFICATION NUMBER 2)
(INTERPRETATION)
    CHARACTER STRING IS PRODUCED BY REPLACING ONE SOUND
    OF A QUESTION PRONUNCIATION CHARACTER STRING WITH
    ANOTHER SOUND LISTED IN THE WEAK DIFFERENT SOUND
    TABLE j1
(CORRESPONDING PRONUNCIATION SIMILARITY CRITERION) S2
(APPLICABLE RANGE OF THE NUMBER OF SOUNDS) 1~10
(CHANGE IN THE NUMBER OF SOUNDS) 0
(REGULAR EXPRESSION) <s00+0>* <j10+0> <s00+0>*
(EXAMPLE) "NU-SHI" AND "RU-SHI" ARE PRODUCED FROM
        "NA-SHI"

FIG. 16B

PRONUNCIATION EXPANDING RULE R4
(CLASSIFICATION NUMBER 3)
(INTERPRETATION)
    CHARACTER STRING IS PRODUCED BY REPLACING ONE SOUND OF A QUESTION PRONUNCIATION CHARACTER STRING WITH ANOTHER SOUND LISTED IN THE SAME-LINE SOUND TABLE d0
(CORRESPONDING SIMILARITY CRITERION) S3
(APPLICABLE RANGE OF THE NUMBER OF SOUNDS) 1~10
(CHANGE IN THE NUMBER OF SOUNDS) 0
(REGULAR EXPRESSION) <s00+0>* <d00+0> <s00+0>*
(EXAMPLE) "NI-SHI", "NU-SHI", "NE-SHI", "NO-SHI", "NA-SA", "NA-SU", "NA-SE" AND "NA-SO" ARE PRODUCED FROM "NA-SHI"

PRONUNCIATION EXPANDING RULE R5
(CLASSIFICATION NUMBER 4)
(INTERPRETATION)
    CHARACTER STRING IS PRODUCED BY REPLACING ONE SOUND OF A QUESTION PRONUNCIATION CHARACTER STRING HAVING FIVE OR MORE SOUNDS WITH ONE OF SOUNDS LISTED IN THE WEAK DIFFERENT SOUND TABLE j1 AND REPLACING ANOTHER SOUND WITH ONE OF SOUNDS LISTED IN THE SAME-LINE SOUND TABLE d0
(CORRESPONDING SIMILARITY CRITERION) S4
(APPLICABLE RANGE OF THE NUMBER OF SOUNDS) 5~10
(CHANGE IN THE NUMBER OF SOUNDS) 0
(REGULAR EXPRESSION) <s00+0>* {(<j10+0> <s00+0>* <d00+0>) | (<d00+0> <s00+0>* <j10+0>)} <s00+0>*
(EXAMPLE) "PI-NU-SO-NI-KKU", "PI-RU-SO-NI-KKU", ···· "PO-RU-SO-NI-KKU" ARE PRODUCED FROM "PA-NA-SO-NI-KKU"

FIG. 17

```
s0 (A)  = A
   .
   .
s0 (-)  = -
j0 (A)  = NA, NU, RU
   .
   .
j0 (-)  = NA, NU, RU
j1 (NA) = NU, RU
j1 (NU) = NA, RU
j1 (RU) = NA, NU
d0 (A)  = I, U, E, O
   .
   .
d0 (PYO) = PYA, PYU

| SOUND POSITION | DERIVATION TYPE | DERIVED SOUND |
|---|---|---|
| 1 | <s00+0> | NA |
| 1 | <j10+0> | RU |
| 1 | <d00+0> | NI, NE, NO |
| 1 | <j10+0>, <d00+0> | NU |
| 2 | <s00+0>, <s0J+0> | SHO |
| 2 | <d00+0> | SHA, SHU |
| 2 | <s00−1>, <j00+1> | NA |
| 2 | <j00+1> | NU, RU |
| 3 | <s00+0>, <s0J+0>, <j00+1> | NA |
| 3 | <s00+1> | SHO |
| 3 | <d00+0> | NI, NE, NO |
| 3 | <j10+0>, <j00+1>, <s00−1> | RU |
| 3 | <j10+0>, <d00+0>, <j00+1> | NU |
| 4 | <s00+0>, <j00+1> | RU |
| 4 | <s00+1>, <j10+0>, <j00+1> | NA |
| 4 | <j10+0>, <j00+1> | NU |
| 4 | <d00+0> | RA, RI, RE, RO |
| 5 | <s00+1>, <j00+1> | RU |
| 5 | <j00+1> | NA, NU |

```
3-3,  <s00 + 0>*  <s0J + 0>  <s00 − 1>*
5-5,  <s00 + 0>   <s00 + 0>*  <j00 + 1>  <s00 + 1>*
4-4,  <s00 + 0>*  <j10 + 0>  <s00 + 0>*
4-4,  <s00 + 0>*  <d00 + 0>  <s00 + 0>*
```

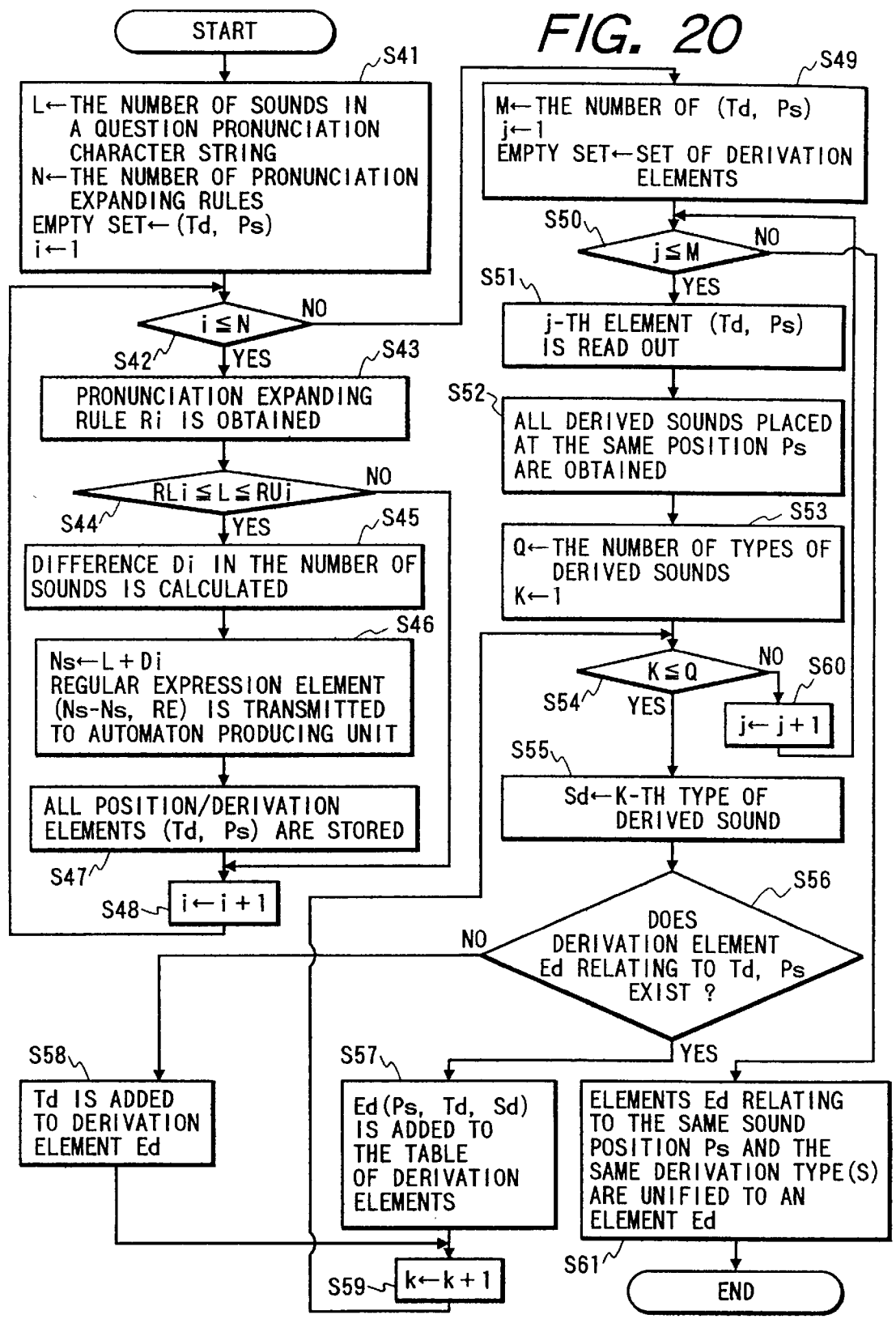

| STATE NUMBER | CONDITION FOR STATE-TRANSITION | | | | | | | RANGE OF APPLICABLE SOUND NUMBER |
|---|---|---|---|---|---|---|---|---|
| | ⟨s00+0⟩ | ⟨s00−1⟩ | ⟨s00+1⟩ | ⟨s0J+0⟩ | ⟨j00+1⟩ | ⟨j10+0⟩ | ⟨d00+0⟩ | |
| 1 | 2 | — | — | 3 | — | 4 | 4 | — |
| 2 | 2 | — | — | 3 | 5 | 4 | 4 | — |
| 3 | — | 3 | — | — | — | — | — | 3-3 |
| 4 | 4 | — | — | — | — | — | — | 4-4 |
| 5 | — | — | 5 | — | — | — | — | 5-5 |

METHOD AND APPARATUS FOR EXPANDING SIMILAR CHARACTER STRINGS

BACKGROUND OF THE INVENTION

1. Field of the Invention

The present invention relates to method and apparatus in which a plurality of similar character strings similar to a question character string (or a question name) are expanded and method and apparatus in which a plurality of registered character string (or registered names) respectively agreeing with one of the similar character strings are retrieved from a data base in which a plurality of registered names such as trademarks for a commodity or a service, names of organic compounds, place names, person names, names of books, names of racing horses and the like are stored.

2. Description of the Related Art

A large scaled text data base in which a large pieces of data indicating character strings has been recently prepared and used in various fields with the spread of a Japanese language input/output apparatus such as a word processor, a personal computer or the like and a memory medium such as a compact disk type read only memory (CD-ROM). Also, a technique for retrieving the data of the character strings at high speed from the large scaled text data base has been recently remarked in an industrial field. In particular, a technique for expanding and preparing pieces of similar character string data indicating names similar to a question name according to a set of similarity criteria and a technique for retrieving a plurality of names respectively agreeing with one of the similar character string data at high speed from a data base in which a plurality of registered names such as trademarks for a commodity or a service, names of organic compounds, place names, person names, book names, names of racing horses and the like are stored have been well-known.

In a conventional character string retrieving method, all similar character strings similar to a question name are expanded and prepared according to a set of similarity criteria, and the all similar character strings are checked one after another to examine whether or not a name agreeing with each of the similar character strings exists in a data base.

2.1. Previously Proposed Art

A similar character string expanding method, an indexing method and a pronunciation character string retrieving method in an operation for retrieving a plurality of registered trademarks agreeing with one of a plurality of similar character strings similar in pronunciation to a question name from a data base are described as an example.

A conventional similar character string expanding method performed by using a plurality of pronunciation similarity criteria is initially described with reference to FIGS. 1 to 4.

FIG. 1 is a block diagram of a conventional similar character string expanding apparatus in which a plurality of expanded pronunciation character strings similar in pronunciation to a question pronunciation character string are expanded according to a conventional similar character string expanding method.

As shown in FIG. 1, a conventional similar character string expanding apparatus 101 is composed of first, second, third, fourth and fifth expanded pronunciation character string expanding units 102 to 106 for respectively storing one of a plurality of pronunciation expanding rules obtained by embodying a plurality of pronunciation similarity criteria and a pronunciation character string expanding procedure corresponding to the pronunciation expanding rule stored and respectively obtaining and expanding all expanded pronunciation character strings similar in pronunciation to a question pronunciation character string input by a user in Japanese katakana expression according to the pronunciation expanding rule stored, an expanded pronunciation character string collecting and rearranging unit 107 for collecting the expanded pronunciation character strings obtained according to the pronunciation expanding rules by the first, second, third, fourth and fifth expanded pronunciation character string expanding units 102 to 106 and rearranging the expanded pronunciation character strings in order of Japanese syllabary, and an overlapped character string removing unit 108 for changing a plurality of expanded pronunciation character strings pronounced by the same pronunciation to one expanded pronunciation character string to remove overlapped character strings from the expanded pronunciation character strings and outputting a group of expanded pronunciation character strings in which any overlapped character string does not exist.

The Japanese syllabary in which a plurality of syllabaries written in the Japanese katakana expression are placed in the same line is shown in FIG. 2, and each of characters such as syllabaries corresponds to a sound (or syllable). Therefore, in this specification, a word "sound" is often used in place of a word "character". For example, the description "a sound existing (or placed) in a character string" is equivalent to the description "a character existing (or placed) in a character string". The pronunciation similarity criteria embodied by the expanded pronunciation character string expanding units 102 to 106 are shown in FIG. 3 as an example. Also, the five pronunciation expanding rules stored in the expanded pronunciation character string expanding units 102 to 106 are shown in FIG. 4 as an example.

In the pronunciation similarity criteria shown in FIG. 3, it is judged that a pair of pronunciation character strings of words are similar to each other in cases where the pronunciation character strings are the same in pronunciation on condition that one of following four types of differences is not considered as a pronunciation difference in the pronunciation character strings. The difference between the existence of a weak sound such as "na", "nu" or "ru" in a position of a word except for a top position of the word and no existence of any weak sound is a first type difference. For example, a pair of pronunciation character strings "na-shi" and "na-shi-ru" are in relationship of the first type difference. In a second type difference, a sound of one character of one pronunciation character string and a sound of one character of another pronunciation character string placed at the same position of words are in relationship of a group of weak sounds "na", "nu" and "ru". For example, a pair of pronunciation character strings "na-shi" and "nu-shi" are in relationship of the second type difference. In a third type difference, a sound of one character of one pronunciation character string and a sound of one character of another pronunciation character string placed at the same position of words are in relationship of a group of sounds placed in the same line of the Japanese syllabary. For example, a pair of pronunciation character strings "na-sho-na-ru" indicating the same pronunciation as a word "national" and "na-sho-nu-ru" are in relationship of the third type difference. The combination of the second type difference and the third type difference is a fifth type difference on condition that the number of sounds in each of a pair of pronunciation character strings is equal to or more than five. For example, a pair of pronunciation character strings "pa-na-so-ni-kku" and "pa-nu-so-ne-kku" are in relationship of the fourth type difference. A symbol "kk" denotes a double consonant. A partial character string "so-ni-kku" indicates the same pronunciation as a word "sonic".

One or more pronunciation character strings are produced from a question pronunciation character string by applying one of following five pronunciation expanding rules shown in FIG. 4, and the pronunciation character strings are adopted as one or more expanded pronunciation character strings similar in pronunciation to the question pronunciation character string.

In a first pronunciation expanding rule, in cases where a question pronunciation character string having two or more sounds has one weak sound "na", "nu" or "ru" at a position except for a top position of the string, an expanded pronunciation character string is produced from the question pronunciation character string by deleting the weak sound of the question pronunciation character string. For example, expanded pronunciation character strings "na-shi-ru" and "na-shi-nu" are produced from a question pronunciation character string "na-shi-nu-ru".

In a second pronunciation expanding rule, an expanded pronunciation character string is produced from a question pronunciation character string by inserting one weak sound "na", "nu" or "ru" after a second or following sound of a question pronunciation character string. For example, expanded pronunciation character strings "na-na-shi", "na-nu-shi", "na-ru-shi", "na-shi-na", "na-shi-nu" and "na-shi-ru" are produced from a question pronunciation character string "na-shi".

In a third pronunciation expanding rule, in cases where one weak sound "na", "nu" or "ru" exists in a question pronunciation character string, an expanded pronunciation character string is produced from the question pronunciation character string by replacing the one weak sound "na", "nu" or "ru" of the question pronunciation character string with another weak sound "na", "nu" or "ru". For example, expanded pronunciation character strings "nu-shi-nu", "ru-shi-nu", "na-shi-na" and "na-shi-ru" are produced from a question pronunciation character string "na-shi-nu".

In a fourth pronunciation expanding rule, an expanded pronunciation character string is produced from a question pronunciation character string by replacing one sound of the question pronunciation character string with another sound placed in the same sound line of the Japanese syllabary. For example, expanded pronunciation character strings "ni-shi", "nu-shi", "ne-shi", "no-shi", "na-sa", "na-su", "na-se" and "na-so" are produced from a question pronunciation character string "na-shi".

In a fifth pronunciation expanding rule, an expanded pronunciation character string is produced from a question pronunciation character string having five or more sounds by replacing one sound S1 of the question pronunciation character string with another sound placed in the same sound line of the Japanese syllabary and replacing another sound S2 of the question pronunciation character string with a weak sound "na", "nu" or "ru" differing from the weak sound S2 in cases where the sound S2 is one of the weak sounds "na", "nu" and "ru". For example, expanded pronunciation character strings "pi-nu-so-ni-kku", "pi-ru-so-ni-kku", - - - , "po-nu-so-ni-kku" and "po-ru-so-ni-kku" are produced from a question pronunciation character string "pa-na-so-ni-kku".

In the above configuration of the conventional similar character string expanding apparatus 101, an operation according to a conventional similar character string expanding method is described.

In each of the first, second, third, fourth and fifth expanded pronunciation character string expanding units 102 to 106, one of the first, second, third, fourth and fifth pronunciation expanding rules shown in FIG. 4 and one of pronunciation character string expanding procedures are stored in one-to-one correspondence.

When a question pronunciation character string "na-sho-na-ru" having four sounds is input to the expanding units 102 to 106, an expanded pronunciation character string "na-sho-ru" produced by deleting a third sound "na" of the question pronunciation character string which is one of the weak sounds "na", "nu" and "ru" and another expanded pronunciation character string "na-sho-na" produced by deleting a fourth sound "ru" of the question pronunciation character string which is one of the weak sounds according to the first pronunciation expanding rule are output from the expanding unit 102.

Also, twelve expanded pronunciation character strings "na-na-sho-na-ru", "na-nu-sho-na-ru", "na-ru-sho-na-ru", "na-sho-na-na-ru", "na-sho-nu-na-ru", "na-sho-ru-na-ru", "na-sho-na-na-ru", "na-sho-na-nu-ru", "na-sho-na-ru-ru", "na-sho-na-ru-na", "na-sho-na-ru-nu" and "na-sho-na-ru-ru" respectively produced by inserting one of the weak sounds "na", "nu" and "ru" in the second or following sound position of the question pronunciation character string according to the second pronunciation expanding rule are output from the expanding unit 103.

Also, six expanded pronunciation character strings "nu-sho-na-ru", "ru-sho-na-ru", "na-sho-nu-ru", "na-sho-ru-ru", "na-sho-na-na" and "na-sho-na-nu" produced by replacing one weak sound "na", "nu" or "ru" of the question pronunciation character string with another weak sound "na", "nu" or "ru" according to the third pronunciation expanding rule are output from the expanding unit 104.

Also, fourteen expanded pronunciation character strings "ni-sho-na-ru", "nu-sho-na-ru", "ne-sho-na-ru", "no-sho-na-ru", "na-sha-na-ru", "nu-shu-na-ru","na-sho-ni-ru", "na-sho-nu-ru","na-sho-ne-ru", "na-sho-no-ru", "na-sho-na-ra", "na-sho-na-ri", "na-sho-na-re" and "na-sho-na-ro" produced by replacing one sound of the question pronunciation character string with another sound placed in the same line of the Japanese syllabary according to the fourth pronunciation expanding rule are output from the expanding unit 105.

In the expanding unit 106, because the number of sounds in the question pronunciation character string is less than five, any expanded pronunciation character string is not output.

Thereafter, the thirty-four expanded pronunciation character strings produced by the expanding units 102 to 106 are collected and rearranged in order of Japanese syllabary by the expanded pronunciation character string collecting and rearranging unit 107. The rearranged expanded pronunciation character strings "na-sho-na", "na-sho-na-na", "na-sho-na-na-ru", "na-sho-na-na-ru", "na-sho-na-nu", "na-sho-na-nu-ru", "na-sho-na-ra", "na-sho-na-ri", "na-sho-na-ru-na", "na-sho-na-ru-nu", "na-sho-na-ru-ru", "na-sho-na-ru-ru", "na-sha-na-ru", "nu-shu-na-ru", "na-sho-na-re", "na-sho-na-ro", "na-sho-ni-ru", "na-sho-nu-na-ru", "na-sho-nu-ru", "na-sho-nu-ru", "na-sho-ne-ru", "na-sho-no-ru", "na-sho-ru", "na-sho-ru-ru", "na-sho-ru-na-ru", "na-na-sho-na-ru", "na-nu-sho-na-ru", "na-ru-sho-na-ru", "ni-sho-na-ru", "nu-sho-na-ru", "nu-sho-na-ru", "ne-sho-na-ru", "no-sho-na-ru" and "ru-sho-na-ru"

are output to the overlapped character string removing unit 108.

In the unit 108, the expanded pronunciation character strings "na-sho-na-na-ru" pronounced by the same pronunciation, the expanded pronunciation character strings "na-sho-na-ru-ru" pronounced by the same pronunciation, the expanded pronunciation character strings "na-sho-nu-ru" pronounced by the same pronunciation and the expanded pronunciation character strings "nu-sho-na-ru" pronounced by the same pronunciation are detected, and one of the expanded pronunciation character strings overlapped in pronunciation is kept, and the other expanded pronunciation character string is abandoned. Therefore, the thirty expanded pronunciation character strings in which any overlapped pronunciation character string does not exist are output as a finally determined expanded pronunciation character strings "na-sho-na", "na-sho-na-na", "na-sho-na-na-ru", "na-sho-na-nu", "na-sho-na-nu-ru", "na-sho-na-ra", "na-sho-na-ri", "na-sho-na-ru-na", "na-sho-na-ru-nu", "na-sho-na-ru-ru", "na-sha-na-ru", "nu-shu-na-ru", "na-sho-na-re", "na-sho-na-ro", "na-sho-ni-ru", "na-sho-nu-na-ru", "na-sho-nu-ru", "na-sho-ne-ru", "na-sho-no-ru", "na-sho-ru", "na-sho-ru-ru", "na-sho-ru-na-ru", "na-na-sho-na-ru", "na-nu-sho-na-ru", "na-ru-sho-na-ru", "ni-sho-na-ru", "nu-sho-na-ru", "ne-sho-na-ru", "no-sho-na-ru" and "ru-sho-na-ru".

Accordingly, the pronunciation expanding rules obtained by embodying the pronunciation similarity criteria are separately applied in the expanded pronunciation character string expanding units 102 to 106, and all expanded pronunciation character strings similar in pronunciation to the question pronunciation character string can be reliably obtained as a plurality of similar pronunciation character strings in character string form. That is, in cases where the question pronunciation character string indicates an application trademark corresponding to an application for trademark registration, all names or character strings similar in pronunciation to the application trademark can be expanded and obtained according to the pronunciation similarity criteria.

Next, a conventional indexing method is described with reference to FIGS. 5 to 10.

FIG. 5 is a block diagram of a conventional indexing apparatus in which a trademark data base is indexed according to a conventional indexing method.

As shown in FIG. 5, a conventional indexing apparatus 111 is composed of a trademark data base 112 for storing a plurality of pronunciation character strings indicating a plurality of registered trademarks and a plurality of trademark numbers consecutively numbered on condition that the trademark numbers and the registered trademarks are in one-to-one correspondence, each of the registered trademarks corresponds to one or more pronunciation character strings and each pronunciation character string indicating a registered trademark is connected to a trademark number of the registered trademark to produce a list of pieces of trademark data respectively indicated by a combination of one pronunciation character string and one trademark number, a trademark data rearranging unit 113 for rearranging the pieces of trademark data to rearrange the pronunciation character strings in order of Japanese syllabary, a pronunciation number adding unit 114 for changing a plurality of pronunciation character strings pronounced by the same pronunciation to one pronunciation character string and adding pronunciation numbers consecutively numbered to the pronunciation character strings in one-to-one correspondence to produce a list of pieces of pronunciation number/character data respectively indicated by a combination of one pronunciation number and one pronunciation character string and a list of pieces of pronunciation/trademark number data respectively indicated by a combination of one pronunciation number corresponding to one or more trademarks and one or more trademark numbers corresponding to the trademarks, a pronunciation/trademark number data storing unit 115 for storing the list of the pronunciation/trademark number data produced by the pronunciation number adding unit 114, a TRIE indexing unit 116 for producing a pronunciation index of the pronunciation number/character data produced by the adding unit 114 in a retrieval structure (called TRIE) form, and a pronunciation index storing unit 117 for storing the pronunciation index of the pronunciation number/character data.

An example of the list of the trademark data stored in the trademark data base 112 is shown in FIG. 6. An example of the trademark data rearranged by the trademark data rearranging unit 113 is shown in FIG. 7. An example of the list of the pronunciation number/character data produced by the pronunciation number adding unit 114 is shown in FIG. 8. An example of the list of the pronunciation/trademark number data produced by the pronunciation number adding unit 114 is shown in FIG. 9. An example of the pronunciation index of the pronunciation number/character data produced by the TRIE indexing unit 116 is shown in FIG. 10.

In the above configuration, an operation of the conventional indexing apparatus 111 in which a pronunciation index of pieces of pronunciation number/character data for twenty pieces of trademark data is produced is described. Twenty pieces of trademark data stored in the trademark data base 112 are rearranged by the trademark data rearranging unit 113 to rearrange twenty pronunciation character strings in order of Japanese syllabary. Therefore, twenty pieces of rearranged trademark data shown in FIG. 7 are obtained. Thereafter, in the pronunciation number adding unit 114, a plurality of pronunciation character strings pronounced by the same pronunciation are changed to one pronunciation character string, a plurality of pronunciation numbers consecutively numbered is added to the pronunciation character strings in one-to-one correspondence to produce pieces of pronunciation number/character data shown in FIG. 8. Also, one or more trademark numbers of one or more trademarks pronounced according to one pronunciation character string indicated by one pronunciation number are found out to determine one or more trademark numbers corresponding to each pronunciation number, and a list of pieces of pronunciation/trademark number data shown in FIG. 9 is produced. Thereafter, in the TRIE indexing unit 116, a sound at each position of each of the pronunciation character strings is regarded as a node, each pronunciation number of a pronunciation character string is annexed as a piece of annexing data to a node corresponding to a sound placed at a final position of the pronunciation character string, and a pronunciation index of the pronunciation number/character data shown in FIG. 10 is produced according to a well-known method. In FIG. 10, a black circle indicates a route node, each of white circles indicates a node corresponding to one sound, and each of shaded circles indicate a node having a piece of annexing data. A value surrounded by parentheses indicates a pronunciation number.

Accordingly, the pronunciation/trademark number data and the pronunciation index of the pronunciation number/character data used to a retrieval operation for the pronunciation character strings can be prepared.

Next, a conventional pronunciation character string retrieving method is described with reference to FIG. 11.

FIG. 11 is a block diagram of a conventional trademark retrieving apparatus in which a trademark agreeing with one of the expanded pronunciation character strings obtained according to the conventional pronunciation character string expanding method is retrieved according to a conventional retrieving method.

As shown in FIG. 11, a conventional trademark retrieving apparatus 121 is composed of the conventional similar character string expanding apparatus 101 for producing a group of expanded pronunciation character strings similar in pronunciation to a question pronunciation character string, the pronunciation/trademark number data storing unit 115 for storing a list of pieces of pronunciation/trademark number data, the pronunciation index storing unit 117, a trademark retrieving unit 122 for performing a retrieval operation for each of the expanded pronunciation character strings produced by the expanding apparatus 101 by retrieving a particular pronunciation number of a particular pronunciation character string, which denotes a trademark and agrees with each expanded pronunciation character string, from the pronunciation index storing unit 117 and by retrieving one or more particular trademark numbers indicated by the particular pronunciation number from the pronunciation/trademark number data storing unit 115, and an overlapped trademark number removing unit 123 for changing a plurality of particular trademark numbers respectively having the same value to one particular trademark number having the value to remove overlapped particular trademark numbers and outputting a group of particular trademark numbers in which any overlapped number does not exist as a final retrieval result.

In the above configuration, an operation of the conventional trademark retrieving apparatus 121 is described.

When the question pronunciation character string "na-sho-na-ru" is input to the conventional similar character string expanding apparatus 101, the thirty expanded pronunciation character strings similar in pronunciation to the question pronunciation character string are produced according to the conventional similar character string expanding method. Thereafter, a retrieval operation is performed by the trademark retrieving unit 122 for each of the expanded pronunciation character strings.

In detail, a particular pronunciation number of a particular pronunciation character string agreeing with an expanded pronunciation character string "na-sho-na" is initially retrieved from the pronunciation index storing unit 117 by tracing a plurality of nodes shown in FIG. 10. That is, a first node corresponding to a top sound "na" of the character string "na-sho-na" is found out by passing the route node (or black node), a second node corresponding to a second sound "sho" of the character string "na-sho-na" is found out by passing the first node, a third node corresponding to a final sound "na" of the character string "na-sho-na" is found out by passing the second node, and a particular pronunciation number "8" annexing to the final sound "na" is retrieved. Thereafter, as shown in FIG. 9, two particular trademark numbers "1100359" and "1101022" indicated by the particular pronunciation number "8" are retrieved from the pronunciation/trademark number data storing unit 115 and are registered in a list of particular trademark numbers.

Therefore, the retrieval operation for the expanded pronunciation character string "na-sho-na" is finished. Also, retrieval operations for the other twenty-nine expanded pronunciation character strings are repeatedly performed, and particular trademark numbers retrieved are registered in the list of particular trademark numbers. In this case, when any node corresponding to a sound of an expanded pronunciation character string does not exist or any particular pronunciation number does not annex to a final sound of the expanded pronunciation character string, a retrieval operation for the expanded pronunciation character string is stopped, no particular trademark number is registered in the list of particular trademark numbers, and a next retrieval operation for a next expanded pronunciation character string is performed. As a result of the retrieval operations, particular pronunciation numbers "8", "9", "7" and "14" of the expanded pronunciation character strings "na-sho-na", "na-sho-na-ra", "na-sha-na-ru" and "ni-sho-na-ru" are retrieved, and a list of particular trademark numbers "1100359", "1101022", "1101022", "1113044", "1101492" and "1106430" is obtained and output to the overlapped trademark number removing unit 123. Thereafter, overlapped particular trademark numbers "1101022" are changed to one particular trademark number "1101022" in the removing unit 123, and a list of particular trademark numbers "1100359", "1101022", "1113044", "1101492" and "1106430" is finally output from the removing unit 123 as a retrieval result.

Accordingly, one or more registered trademarks corresponding to one or more particular trademark numbers obtained by the conventional pronunciation character string retrieving apparatus 121 can be reliably obtained as names similar in pronunciation to the question pronunciation character string.

2.2. Problems to be Solved by the Invention

However, in the conventional similar character string expanding apparatus 101 and method, because all expanded pronunciation character strings similar in pronunciation to the question pronunciation character string are collected and rearranged after one or more expanded pronunciation character strings are obtained in each of the expanding units 102 to 106 by separately applying each of the pronunciation expanding rules obtained by embodying the pronunciation similarity criteria, in cases where the pronunciation similarity criteria are complicated, the pronunciation expanding rules are also complicated, and it takes long time to expand all expanded pronunciation character strings. Also, in cases where a large number of expanded pronunciation character strings are expanded, because the expanded pronunciation character strings are in character string form, a memory having a large capacity is required to store all expanded pronunciation character strings.

Also, in cases where the pronunciation index of the pronunciation number/character data produced in the conventional indexing apparatus 111 and method is used for a retrieval operation, it is impossible to retrieve a plurality of pronunciation numbers in a retrieval operation performed for a plurality of expanded pronunciation character strings. Therefore, in cases where a large number of expanded pronunciation character strings are expanded, it takes long time in the conventional pronunciation character string retrieving apparatus 121 and method to retrieve one or more registered trademarks because it is required to perform the retrieval operation for each of the expanded pronunciation character strings.

In particular, in Japan, as is written in ISBN4-8271-0334-8 (pp.122–125) of "Trademark Examination Standards" edited by the Trademark Division of the Japanese Patent Office and published by the Patent Association, because the trademark similarity criteria actually used for the examination of application trademarks are deeply complicated, pronunciation expanding rules based on the trademark similarity criteria are also complicated. Therefore, the number of expanded pronunciation character strings similar in pronunciation to a question pronunciation character string becomes in the range from tens of thousands to tens of millions. Also, millions of registered or pending trademarks exist in Japan, and each of the registered or pending trademarks is expressed by any of several pronunciation character strings. Therefore, a trademark data base having a large capacity is required to store the pronunciation character strings and the trademark numbers corresponding to the registered or pending trademarks. In this case, it takes at least one-thousandths of a second to perform a retrieval operation for an expanded pronunciation character string by using a pronunciation index of the pronunciation number/character data produced in TRIE form. Therefore, in cases where one or more similar trademarks similar in pronunciation to an application trademark are retrieved from an actual trademark data base according to the trademark similarity criteria actually used for the examination, a retrieval time is in the range from several minutes to several hours. Therefore, there is a drawback that an retrieval of one or more similar trademarks similar in pronunciation to an application trademark cannot performed at high speed. For example, it is desired that an retrieval of one or more similar trademarks similar in pronunciation to an application trademark be performed within several seconds.

Also, in the conventional similar character string expanding apparatus 101 and method, because each of the pronunciation similarity criteria is manually transformed into one pronunciation expanding rule programmed in a procedure form and the pronunciation expanding rule is stored in each of the expanding units 102 to 106, when the pronunciation similarity criteria are altered, it is required to produce an altered pronunciation expanding rule programmed in the procedure form from each of the altered pronunciation similarity criteria and store the altered pronunciation expanding rules in the expanding units 102 to 106 in one-to-one correspondence. Therefore, it is troublesome to satisfy this requirement, and there is a drawback that a plurality of expanded pronunciation character strings cannot be immediately expanded according to the altered pronunciation similarity criteria.

SUMMARY OF THE INVENTION

A first object of the present invention is to provide, with due consideration to the drawbacks of such conventional similar character string expanding method and apparatus, similar character string expanding method and apparatus in which a large number of expanded pronunciation character strings similar in pronunciation to a question pronunciation character string are substantially obtained by expanding the question pronunciation character string at a short time according to a plurality of pronunciation similarity criteria without any troublesomeness even though one or more pronunciation similarity criteria are altered and all of the expanded pronunciation character strings are substantially stored in a memory having a small capacity.

A second object of the present invention is to provide, with due consideration to the drawbacks of such conventional retrieving method and apparatus, character string retrieving method and apparatus in which a plurality of registered character strings respectively agreeing with one of a large number of expanded pronunciation character strings obtained according to the similar character string expanding method are substantially retrieved from a data base at high speed.

The first object is achieved by the provision of a similar character string expanding method, comprising the steps of:
preparing one or more similar sound tables according to a plurality of pronunciation similarity criteria, each of the similar sound tables indicating one or more similar sounds similar in pronunciation to one key sound for each of a plurality of key sounds;
preparing a regular expression and an applicable range according to each of the pronunciation similarity criteria, each of the regular expressions indicating one or more strings of derivation types, each of derivation types indicating how each of a plurality of derived sounds placed at positions of an expanded pronunciation character string is derived from a remarked sound placed at a remarked position of a remarked pronunciation character string, and the number of sounds in the remarked pronunciation character string being within a corresponding applicable range;
receiving a question pronunciation character string;
producing a set of derivation elements for the question pronunciation character string according to the similar sound tables and the regular expressions corresponding to the pronunciation similarity criteria, each of the derivation elements in the set being composed of a derived sound derived from one of a plurality of sounds in the question pronunciation character string, a sound position of the derived sound in each of one or more expanded pronunciation character strings expanded from the question pronunciation character string and one or more derivation types respectively used to derive the derived sound at the sound position of each expanded pronunciation character string, and the derivation types being extracted from the strings of derivation types indicated by the regular expressions prepared;
producing a set of a plurality of regular expression elements respectively composed of a regular expression and an applicable sound number, the applicable sound number indicating the number of sounds in each of one or more expanded pronunciation character strings expanded from the question pronunciation character string, and each of the regular expression elements being produced from one regular expression and one applicable range prepared according to one of the pronunciation similarity criteria and the number of sounds in the question pronunciation character string;
producing a finite state automaton indicating one or more applicable strings of derivation types from the set of regular expression elements, each applicable string of derivation types being indicated by one regular expression of one regular expression element on condition that the number of sounds in an expanded pronunciation character string expanded from the question pronunciation character string according to the applicable string of derivation types agrees with one applicable sound number of the regular expression element; and
outputting the set of derivation elements and the finite state automaton to expand one or more expanded pronunciation character strings as one or more similar pronunciation character strings similar in pronunciation to the question pronunciation character string according to the set of derivation elements and the finite state automaton.

In the above steps, one or more similar sound tables and a plurality of sets of regular expressions and applicable ranges are prepared in advance according to a plurality of pronunciation similarity criteria. When a question pronunciation character string is received, a set of derivation elements for the question pronunciation character string is produced according to the similar sound tables and the regular expressions. Each derivation element is composed of a sound position, a derived sound and one or more derivation types. The derived sound placed at the sound position of each of expanded pronunciation character strings expanded from the question pronunciation character string is derived from one of sounds in the question pronunciation character string according to each of the derivation types. Also, a set of regular expression elements is produced. A regular expression of each regular expression element is produced from a regular expression relating to one pronunciation similarity criterion. An applicable sound number of each regular expression element is produced from an applicable range relating to one pronunciation similarity criterion and the number of sounds in the question pronunciation character string. Thereafter, a finite state automaton indicating one or more applicable strings of derivation types is produced from the set of regular expression elements. Each applicable string of derivation types is indicated by one regular expression of one regular expression element, and the number of sounds in an expanded pronunciation character string expanded from the question pronunciation character string according to the applicable string of derivation types agrees with one applicable sound number of the regular expression element. Thereafter, the set of derivation elements and the finite state automaton are output. In this case, one or more expanded pronunciation character strings expanded from the question pronunciation character string according to the set of derivation elements and the finite state automaton are similar in pronunciation to the question pronunciation character string. Therefore, the output of the set of derivation elements and the finite state automaton is equivalent to the output of one or more similar pronunciation character strings similar in pronunciation to the question pronunciation character string.

Accordingly, because the similar pronunciation character strings are not directly output but the set of derivation elements and the finite state automaton are output, even though millions of similar pronunciation character strings exist, an output volume can be considerably reduced.

Also, because all pronunciation expanding rules are not separately applied but are applied in a group in the production of the finite state automaton, even though tens of pronunciation expanding rules are applied and millions of similar pronunciation character strings are produced from the question pronunciation character string, the derivation elements and the finite state automaton in which tens of pronunciation expanding rules are applied in a group can be obtained at a short time.

Also, because each of a plurality of pronunciation expanding rules can be simply indicated by a combination of an applicable range and a regular expression, even though one or more pronunciation similarity criteria are altered, a plurality of pronunciation expanding rules corresponding to the altered pronunciation similarity criteria can be promptly prepared without changing programs of the pronunciation expanding rules.

Also, the first object of the present invention is achieved by the provision of a similar character string expanding apparatus, comprising:

similar sound table storing means for storing one or more similar sound tables prepared according to a plurality of pronunciation similarity criteria, each of the similar sound tables indicating one or more similar sounds similar in pronunciation to one key sound for each of a plurality of key sounds;

regular expression storing means for storing a plurality of sets respectively composed of a regular expression and an applicable range prepared according to each of the pronunciation similarity criteria, each of the regular expressions indicating one or more strings of derivation types, each of derivation types indicating how each of a plurality of derived sounds placed at positions of an expanded pronunciation character string is derived from a remarked sound placed at a remarked position of a remarked pronunciation character string, and the number of sounds in the remarked pronunciation character string being within a corresponding applicable range;

question pronunciation character string receiving means for receiving a question pronunciation character string;

derivation element producing means for producing a set of derivation elements for the question pronunciation character string received by the derivation element producing means according to the similar sound tables stored in the similar sound table storing means and the regular expressions stored in the regular expression storing means, producing a set of regular expression elements from the regular expressions and the applicable ranges stored in the regular expression storing means and outputting the set of derivation elements, each of the derivation elements in the set being composed of a derived sound derived from one of a plurality of sounds in the question pronunciation character string, a sound position of the derived sound in each of one or more expanded pronunciation character strings expanded from the question pronunciation character string and one or more derivation types respectively used to derive the derived sound at the sound position of each expanded pronunciation character string, the derivation types being extracted from the strings of derivation types indicated by the regular expressions prepared, each of the regular expression elements being composed of a regular expression and an applicable sound number and being produced from a regular expression and an applicable range prepared according to one of the pronunciation similarity criteria and the number of sounds in the question pronunciation character string, and the applicable sound number indicating the number of sounds in each of one or more expanded pronunciation character strings expanded from the question pronunciation character string; and finite state automaton producing means for producing a finite state automaton indicating one or more applicable strings of derivation types from the set of regular expression elements produced by the derivation element producing means and outputting the finite state automaton to expand one or more expanded pronunciation character strings as one or more similar pronunciation character strings similar in pronunciation to the question pronunciation character string according to the set of derivation elements output by the derivation element producing means and the finite state automaton, each applicable string of derivation types being indicated by one regular expression of one regular expression element on condition that the number of sounds in an expanded pronunciation character string expanded from the question pronunciation character string according to the applicable string of derivation types agrees with one applicable sound number of the regular expression element.

In the above configuration, one or more similar sound tables are stored in advance in the similar sound table storing means, and a plurality of sets of regular expressions and applicable ranges are stored in advance in the regular expression storing means. When a question pronunciation character string is received by the question pronunciation character string receiving means, a set of derivation elements for the question pronunciation character string is produced by the derivation element producing means according to the similar sound tables and the regular expressions. Also, a set of regular expression elements is produced from the regular expressions and the applicable ranges by the derivation element producing means. The set of derivation elements is output as a part of expanded results equivalent to a plurality of expanded pronunciation character strings similar in pronunciation to the question pronunciation character string.

Thereafter, a finite state automaton is produced from the set of regular expression elements by the finite state automaton producing means and is output as a remaining part of the expanded results.

Accordingly, the expanded pronunciation character strings similar in pronunciation to the question pronunciation character string can be substantially obtained as a plurality of similar pronunciation character strings.

Also, because the expanded pronunciation character strings are not directly output, even though millions of expanded pronunciation character strings exist, the expanded pronunciation character strings can be substantially obtained at a short time, and the expanded pronunciation character strings can be substantially stored in a memory having a small capacity.

Also, even though one or more pronunciation similarity criteria are altered, because the similar sound tables and the sets of regular expressions and applicable ranges are altered, the alternation of the pronunciation similarity criteria can be reflected on the set of derivation elements and the finite state automaton without any troublesomeness.

The second object is achieved by the provision of a character string retrieving method for retrieving one or more registered character strings similar in pronunciation to a question pronunciation character string according to one or more pronunciation similarity criteria, comprising the steps of:

preparing a set of derivation elements, each of the derivation elements in the set being composed of a derived sound derived from one of a plurality of sounds in the question pronunciation character string, a sound position of the derived sound in each of the registered character strings and a derivation type indicating both the derivation of the derived sound from a remarked sound placed at a remarked position in the question pronunciation character string and a positional difference between the sound position and the remarked position;

preparing a finite state automaton indicating one or more groups of applicable strings of derivation types and one or more applicable sound numbers, each of the applicable strings of derivation types in one group being obtained from one of the pronunciation similarity criteria, and each of the applicable sound numbers denoting the limitation for one or more character strings derived from the applicable strings of derivation types in one group;

producing a plurality of possible strings of derivation types, respectively obtained by arranging one or more derivation types of one or more derivation elements extracted from the set of derivation elements in order of the sound position, as all candidates for the registered character strings;

judging whether or not each of the possible strings of derivation types agrees with one of the applicable strings of derivation types in the groups;

extracting one or more possible strings of derivation types respectively agreeing with one of the applicable strings of derivation types as one or more probable strings of derivation types;

judging whether or not each of probable character strings, respectively obtained by arranging one or more derived sounds relating to one or more derivation types of one probable string in order of the sound position, satisfies one corresponding applicable sound number;

extracting one or more probable strings of derivation types, which correspond to one or more probable character strings respectively satisfying the corresponding applicable sound number, as one or more definite strings of derivation types;

arranging one or more derived sounds corresponding to one or more derivation types of each definite string in order of the sound position to produce one or more definite character strings for the definite strings; and retrieving one or more character strings, which each agree with one of the definite character strings and are registered in a data base, from the data base as the registered character strings.

In the above steps, a set of derivation elements and a finite state automaton are prepared, for example, in the similar character string expanding apparatus. Thereafter, one or more derivation types of one or more derivation elements extracted from the set of derivation elements are arranged in order of the sound position to produce a possible string of derivation types. The production of the possible string is repeated until all possible strings of derivation types are produced as all candidates for the registered character strings.

Thereafter, one or more possible strings of derivation types respectively agreeing with one of the applicable strings of derivation types indicated by the finite state automaton are extracted and called one or more probable strings of derivation types. Thereafter, one or more probable strings of derivation types respectively satisfying one corresponding applicable sound number are extracted and called one or more definite strings of derivation types. Thereafter, one or more derived sounds corresponding to each definite string of derivation types are arranged in order of the sound position to produce a definite character string for each of the definite strings, and one or more registered character strings agreeing with one or more definite character strings are retrieved from a data base as one or more character strings similar in pronunciation to the question pronunciation character string.

Accordingly, because the set of derivation elements and the finite state automaton are prepared by using the pronunciation similarity criteria and the question pronunciation character string in place of a large number of expanded pronunciation character strings similar in pronunciation to the question pronunciation character string, one or more definite character strings which each satisfy the pronunciation similarity criteria and are similar in pronunciation to the question pronunciation character string can be produced at high speed, and one or more registered character strings which each agree with one of the definite character strings and are stored in a data base can be retrieved from the data base.

Also, the second object of the present invention is achieved by the provision of a character string retrieving apparatus for retrieving one or more registered character strings similar in pronunciation to a question pronunciation character string according to one or more pronunciation similarity criteria, comprising:

derivation element set storing means for storing a set of derivation elements, each of the derivation elements in the set being composed of a derived sound derived from one of a plurality of sounds in the question pronunciation character string, a sound position of the derived sound in each of the registered character strings and a derivation type indicating both the derivation of the derived sound from a remarked sound placed at a remarked position in the question pronunciation character string and a positional difference between the sound position and the remarked position;

finite state automaton storing means for storing a finite state automaton indicating one or more groups of applicable strings of derivation types and one or more applicable sound numbers, each of the applicable strings of derivation types in one group being obtained from one of the pronunciation similarity criteria, and each of the applicable sound numbers denoting the limitation for one or more character strings derived from the applicable strings of derivation types in one group;

derivation type string producing means for producing a plurality of possible strings of derivation types, respectively obtained by arranging one or more derivation types of one or more derivation elements extracted from the set of derivation elements stored in the derivation element set storing means in order of the sound position, as all candidates for the registered character strings;

derivation type string judging means for judging whether or not each of the possible strings of derivation types produced by the derivation type string producing means agrees with one of the applicable strings of derivation types in the groups which are indicated by the finite state automaton stored in the finite state automaton storing means, extracting one or more possible strings of derivation types respectively agreeing with one of the applicable strings of derivation types as one or more probable strings of derivation types, judging whether or not each of probable character strings, respectively obtained by arranging one or more derived sounds relating to one or more derivation types of one probable string in order of the sound position, satisfies one corresponding applicable sound number which are indicated by the finite state automaton stored in the finite state automaton storing means, and extracting one or more probable strings of derivation types, which correspond to one or more probable character strings respectively satisfying the corresponding applicable sound number, as one or more definite strings of derivation types; and character string retrieving means for arranging one or more derived sounds corresponding to one or more derivation types of each definite string extracted by the derivation type string judging means in order of the sound position to produce one or more definite character strings for the definite strings and retrieving one or more character strings which each agree with one of the definite character strings and are registered in a data base, from the data base as the registered character strings.

In the above configuration, one or more derivation types of one or more derivation elements are extracted from the set of derivation elements and are arranged in order of the sound position, and a possible string of derivation types is produced by the derivation type string producing means each time one derivation type is arranged. Thereafter, it is judged by the derivation type string judging means whether or not each of the possible strings of derivation types agrees with one of the applicable strings of derivation types. Also, it is judged by the derivation type string judging means whether or not each of the probable strings of derivation types agreeing with one of the applicable strings of derivation types satisfies one corresponding applicable sound number, and one or more definite strings of derivation types satisfying the corresponding applicable sound numbers are extracted.

Thereafter, one or more derived sounds corresponding to one or more derivation types of each definite string are arranged in order of the sound position, and one or more definite character strings are produced for the definite strings by the character string retrieving means. Thereafter, one or more character strings which each agree with one of the definite character strings and are registered in a data base, are retrieved from the data base as the registered character strings.

Accordingly, the definite character strings which each satisfy the pronunciation similarity criteria and are similar in pronunciation to the question pronunciation character string can be produced at high speed, and the registered character strings which each agree with one of the definite character strings and are stored in a data base can be retrieved from the data base.

BRIEF DESCRIPTION OF THE DRAWINGS

The objects, features and advantages of the present invention will be apparent from the following description taken in conjunction with the accompanying drawings, in which:

FIG. 1 is a block diagram of a conventional similar character string expanding apparatus in which a plurality of expanded pronunciation character strings similar in pronunciation to a question pronunciation character string are expanded according to a conventional similar character string expanding method;

FIG. 2 shows a Japanese syllabary;

FIG. 3 shows a plurality of pronunciation similarity criteria applied for the conventional similar character string expanding method and apparatus and similar character string expanding method and apparatus according to the present invention;

FIG. 4 shows five pronunciation expanding rules obtained from the pronunciation similarity criteria;

FIG. 6 shows a list of pieces of trademark data stored in a trademark data base shown in FIG. 5;

FIG. 7 shows a list of pieces of trademark data rearranged by a trademark data rearranging unit shown in FIG. 5;

FIG. 8 shows a list of pieces of pronunciation number character data produced by a pronunciation number adding unit shown in FIG. 5;

FIG. 9 shows a list of pieces of pronunciation/trademark number data produced by a pronunciation number adding unit shown in FIG. 5;

FIG. 12 is a block diagram of a similar character string expanding apparatus, in which a similar character string expanding method is performed, according to a first embodiment of the present invention;

FIGS. 13A, 13B and 13C show a similar sound table group composed of a same-sound table, a weak sound table, a weak different sound table and a same-line sound table;

FIG. 14 shows a method for producing a pronunciation expanding rule composed of a regular expression and an applicable range of the number of sounds in a question pronunciation character string from a pronunciation similarity criterion;

FIGS. 16A and 16B show five pronunciation expanding rules produced from four pronunciation similarity criteria shown in FIG. 3;

FIG. 17 shows the similar sound tables, the definition of the derivation constraints, and five pronunciation expanding rules respectively composed of a regular expression and an applicable range of the number of sounds filed in a pronunciation expanding rule file shown in FIG. 15;

FIG. 18 shows a table of derivation elements for a question pronunciation character string "na-sho-na-ru";

FIG. 20 is a flow chart of an operation performed in a derivation element producing unit shown in FIG. 15;

DETAIL DESCRIPTION OF THE EMBODIMENTS

Figure 5:
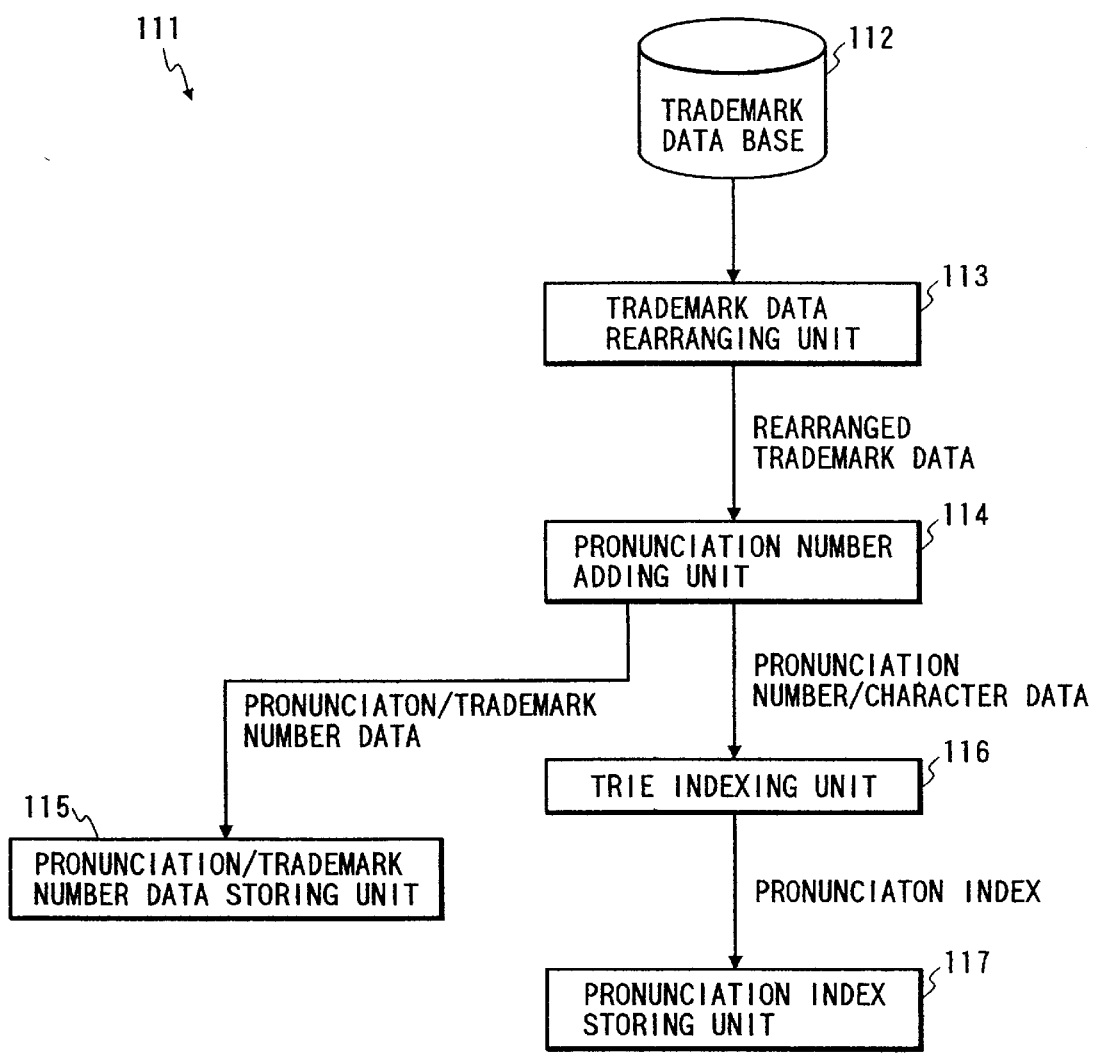
FIG. 5 is a block diagram of a conventional indexing apparatus in which a trademark data base is indexed according to a conventional indexing method.
Figure 10:
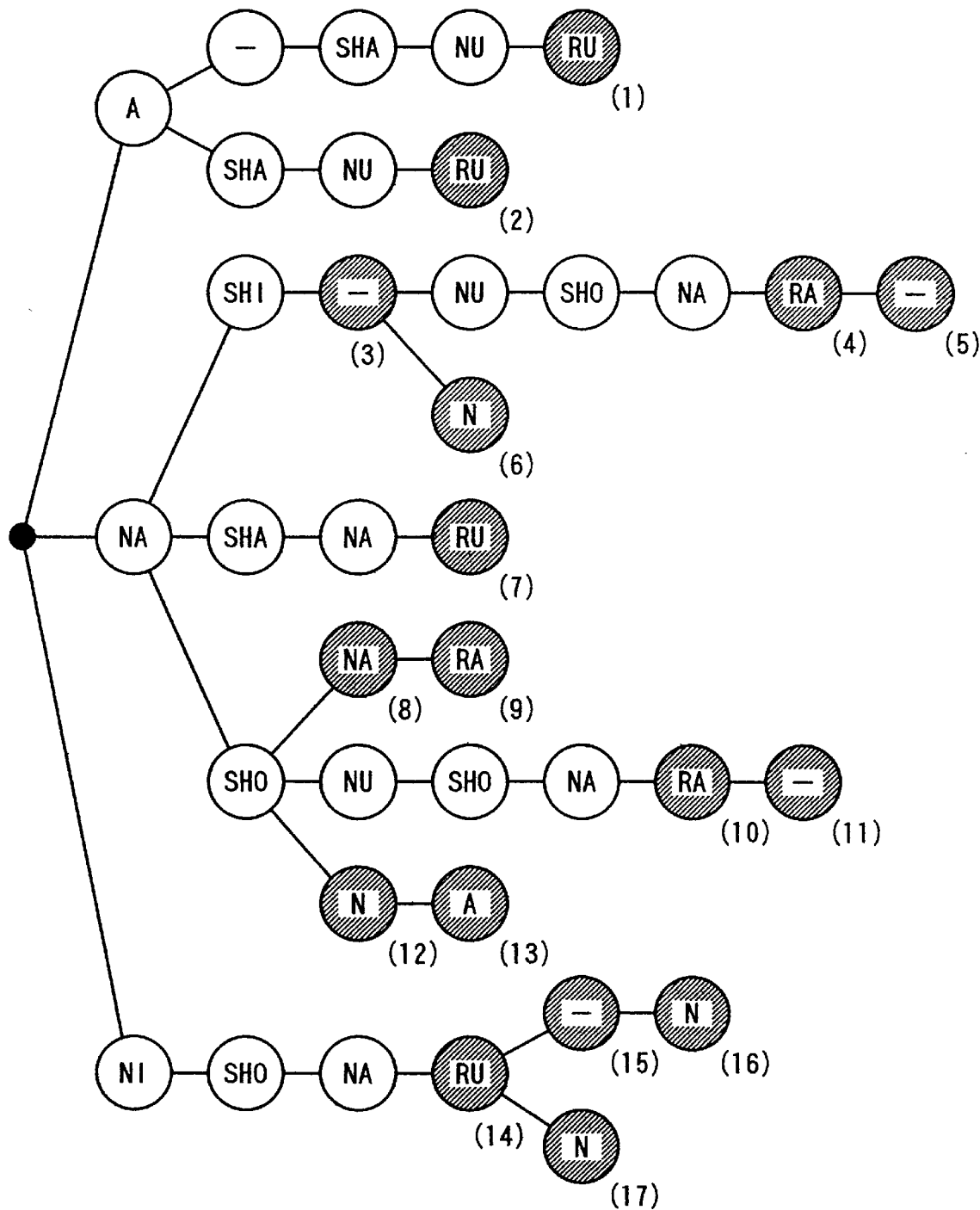
FIG. 10 shows a pronunciation index of pieces of pronunciation number/character data produced by a TRIE indexing unit shown in FIG. 5.
Figure 11:
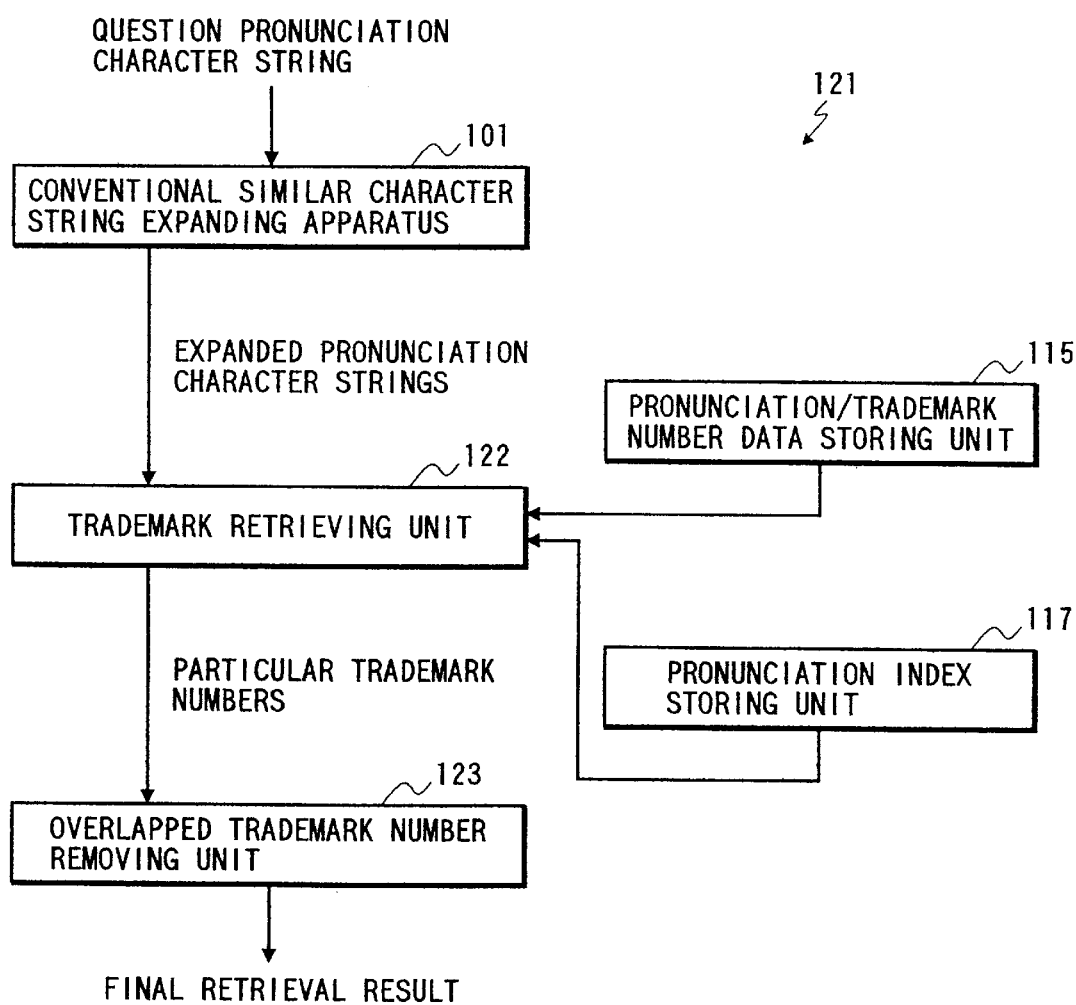
FIG. 11 is a block diagram of a conventional retrieving apparatus in which a trademark agreeing with one of the expanded pronunciation character strings obtained according to the conventional pronunciation character string expanding method is retrieved according to a conventional retrieving method.

Preferred embodiments of similar character string expanding apparatus and method and character string retrieving apparatus and method according to the present invention are described with reference to drawings. A similar pronunciation character string is called an expanded pronunciation character string similar in pronunciation to a question pronunciation character string in following embodiments.

A derivation model for deriving a derived sound included in an expanded pronunciation character string similar in pronunciation to a question pronunciation character string from a remarked sound of the question pronunciation character string, an expression method for expressing a derivation type indicating steps required to obtain the derived sound and expression of pronunciation expanding rules are initially described to make easy the comprehension of embodiments, prior to the description of the embodiments according to the present invention.

In a derivation model according to the present invention, each derived sound of an expanded pronunciation character string is derived from a remarked sound of the question pronunciation character string. The derivation model is expressed according to a first step "Y" relating to a derivative constraint, a second step "XX" relating to a change of a remarked sound to a derived sound and a third step "ZZ" relating to a change of a position of the remarked sound to a position of the derived sound as follows.

"Y"; A remarked sound of a question pronunciation character string and another or other sounds of the question pronunciation character string placed in front or in the rear of the question pronunciation character string satisfy a derivative constraint.

"XX"; One or more sounds relating to the remarked sound are looked up in a similar sound table (a same sound table S0, a weak sound table j0, a weak different table j1 or a same-line sound table d0) by using the remark sound as a key sound, and the remarked sound is changed to one of the sounds looked up as a derived sound.

"ZZ"; The derived sound is placed at a position in an expanded pronunciation character string shifted by ZZ sounds from a position of the remarked sound or is placed at the same position in an expanded pronunciation character string as that of the remarked sound.

The derivative constraint indicated by "Y" is satisfied in cases where following items (i), (ii) and (iii) are satisfied.

(i); A first particular sound of the question pronunciation character string is spaced "AA" sounds apart from the remarked sound.

(ii); One or more sounds relating to the first particular sound are looked up in the similar sound table "Vv" by using the first particular sound as a key sound.

(iii); A second particular sound of the question pronunciation character string spaced "BB" sounds apart from the remarked sound agrees with one of the sounds looked up.

The derivative constraint is indicated by a symbol "AAV-VBB". In this case, the symbols "AA" and "BB" are respectively indicated by an integral number. In cases where the first or second particular sound is placed in front of the remarked sound, the symbol is indicated by a negative value. In cases where the first or second particular sound is placed in the rear of the remarked sound, the symbol is indicated by a positive value. The symbol "VV" is indicated by a name of the similar sound table.

An expression method for expressing a derivation type is described.

A derivation type indicating steps "Y", "XX" and "ZZ" required to obtain the derived sound is indicated by a symbol <YXXZZ>. In this case, the symbol "XX" is indicated by a name of the similar sound table. The symbol "Y" is indicated by a letter such as "0", "J" or the like. The symbol "ZZ" indicating the number of shifted sounds is expressed by an integral number in the same manner as the symbols "AA" and As an example, as shown in FIG. 12, in cases where an expanded pronunciation character string "na-sho-{-}-no" is derived from a question pronunciation character string "na-sho-na-ru", the derivation of a derived sound "no" placed at a fourth position of the expanded pronunciation character string "na-sho-{-}-no" according to the derivation model is described with reference to FIGS. 13A, 13B and 13C. In this case, a sound "{-}" functions to change a short vowel included in a preceding sound "sho" to a long vowel included in the combination of the two sounds "sho" and "{-}".

FIGS. 13A, 13B and 13C show a similar sound table group composed of a same-sound table, a weak sound table, a weak different sound table and a same-line sound table.

In cases where a sound "na" placed at a third position of the question pronunciation character string "na-sho-na-ru" is adopted as a remarked sound, the derivative constraint "Y" is satisfied as follows.

"Y"; A second particular sound "ru" of the question pronunciation character string succeeding to the remarked sound "na" agrees with one of sounds "na", "nu" and "ru" looked up in a weak sound table j0 shown in FIG. 13A by using the remarked sound "na" as a key sound.

The second step "XX" is satisfied as follows.

"XX"; The derived sound "no" agrees with one of sounds "ni", "nu", "ne" and "no" looked up in a same-line sound table do shown in FIG. 13A by using the remark sound "na" as a key sound.

The third step "ZZ" is satisfied as follows.

"ZZ"; The derived sound "no" is placed at a position of the expanded pronunciation character string spaced one sound in the rear of a third position of the remarked sound "na".

Therefore, the derivative constraint "Y" is indicated by J=+0j0+1. That is, because the remarked sound "na" agrees with a first particular sound, "AA" is equal to +0. Because the second particular sound "ru" succeeds to the remarked sound "na", "BB" is equal to +1. Because the weak sound table j0 is referred, "VV" is indicated by j0. Also, a derivation type for the derived sound "no" derived from the remarked sound "na" is expressed by <d0J+1>according to the expressing method. That is, because the same-line sound table d0 is referred, "XX" is indicated by do. Because the derived sound "no" is spaced one sound in the rear of the remarked sound "na", "ZZ" is equal to +1.

A model for a plurality of pronunciation expanding rules is expressed as follows by using the derivation model.

(1) A plurality of derivation types are annexed to each of sounds of an expanded pronunciation character string. In other words, each sound of an expanded pronunciation character string is derived from any remarked sound of a question pronunciation character string according to any of the derivation types.

(2) A particular derivation type is arbitrarily selected from a plurality of derivation types, which are annexed to one sound of an expanded pronunciation character string and conform to a plurality of pronunciation expanding rules, for each of the sounds of the expanded pronunciation character string, a plurality of particular derivation types corresponding to the sounds of the expanded pronunciation character string are arranged in order of correspondence to the sounds arranged in order to form a string of particular derivation types, and a group of the pronunciation expanding rules is expressed as a set of a plurality of strings of particular derivation types.

(3) The set of strings of particular derivation types is expressed by a combination of an applicable range of the number of sounds existing in the question pronunciation character string and a regular expression indicating strings of particular derivation types for convenience.

FIG. 14 shows a method for producing a pronunciation expanding rule composed of a regular expression and an applicable range of the number of sounds in a question pronunciation character string from a pronunciation similarity criterion.

In the top portion of FIG. 14, contents of a set of a plurality of strings of particular derivation types are described as an example. In cases where a plurality of strings of particular derivation types conforming to the contents are actually embodied, the strings of particular derivation types are shown in the second portion from the top portion. Here, a derivation type <s0O+0>indicates that a sound agreeing with a remarked sound of a question pronunciation character string is derived at the same position as that of the remarked sound as a derived sound of an expanded pronunciation character string without any derivative constraint. A derivation type <d0O+0>indicates that a sound belonging to the same line as that of a remarked sound of a question pronunciation character string is derived at the same position as that of the remarked sound as a derived sound of an expanded pronunciation character string without any derivative constraint.

The strings of particular derivation types are expressed by a pronunciation expanding rule indicated by a combination of an applicable range of the number of sounds in a question pronunciation character string and a regular expression <s0O+0><s0O+0>* <d0O+0><s0O+0>*, as is shown in the third portion from the top portion of FIG. 14. The interpretation of the applicable range and the regular expression is described in the bottom portion of FIG. 14. That is, a top sound of an expanded pronunciation character string is derived according to the derivation type <s0O+0>, zero or more second sounds of the expanded pronunciation character string are derived according to the derivation type <s0O+0>, a third sound of the expanded pronunciation character string is derived according to the derivation type <d0O+0>, zero or more final sounds of the expanded pronunciation character string are derived according to the derivation type <s0O+0>, and the number of top, second, third and final sounds is in the applicable range from 2 to 10. Here, the regular expression is widely used to express a pattern of character strings in a retrieval operation for which a character string retrieving tool such as a software called GREP or the like is used in a personal computer or a work station. In this embodiment, the regular expression is used to express a pattern of strings of particular derivation types. Because the regular expression is described in detail in various letters (Hopcroft,J. E., Ullman,J. D.:"Formal Languages and Their Relations to Automata", Addison-Weslay, 1969, and Salomaa,A.:"Formal Languages", Academic Press, 1973), the description of the regular expression is omitted.

Figure 15:
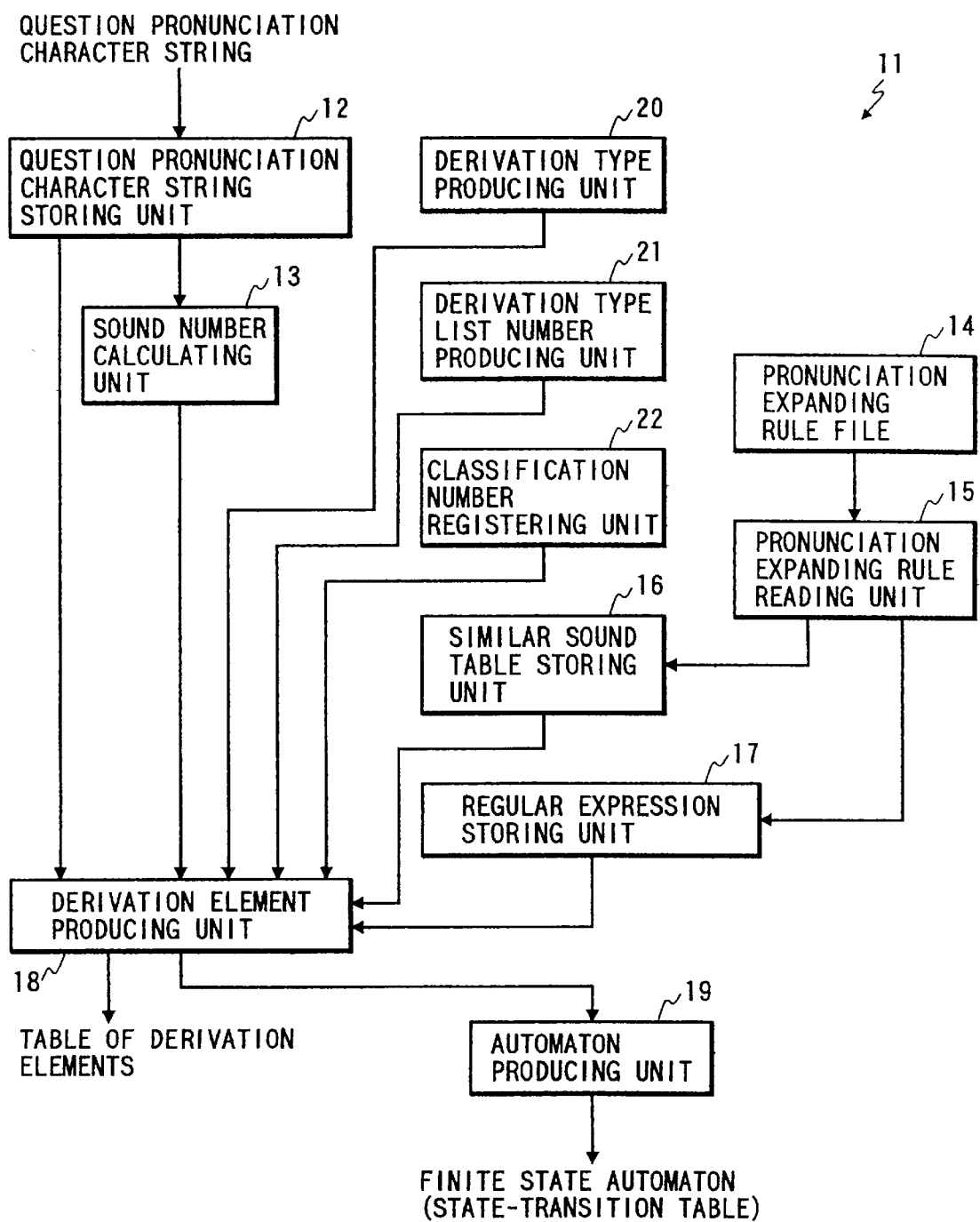
FIG. 15 is a block diagram of a similar character string expanding apparatus, in which a similar character string expanding method is performed, according to a first embodiment of the present invention.

FIG. 15 is a block diagram of a similar character string expanding apparatus, in which a similar character string expanding method is performed, according to a first embodiment of the present invention.

As shown in FIG. 15, a similar character string expanding apparatus 11 comprises:

a question pronunciation character string storing unit 12 for temporarily storing a question pronunciation character string input by an user;

a sound number calculating unit 13 for calculating the number of sounds in the question pronunciation character string stored in the storing unit 12;

a pronunciation expanding rule file 14 for filing a plurality of pronunciation expanding rules, one or more similar sound tables and the definition of one or more derivative constraints prepared according to a plurality of pronunciation similarity criteria, each pronunciation expanding rule being composed of a combinations of a regular expressions and an applicable range of the number of sounds in a question pronunciation character string;

a pronunciation expanding rule reading unit 15 for reading the pronunciation expanding rules, the similar sound tables and the definition of the derivative constraints filed in the file 14;

a similar sound table storing unit 16 for storing the similar sound tables read by the reading unit 15;

a regular expression storing unit 17 for storing the pronunciation expanding rules respectively composed of a regular expression and an applicable ranges of the number of sounds which are read by the reading unit 15;

a derivation element producing unit 18 for producing a table of derivation elements respectively composed of a sound position in an expanded pronunciation character string similar in pronunciation to the question pronunciation character string stored in the storing unit 12, a list of one or more derived sounds respectively expected to be placed at the same sound position and one or more derivation types annexed to each of the derived sounds, producing a set of regular expression elements respectively composed of the number of sounds in an expanded pronunciation character string and a regular expression transmitted from the storing unit 17 and outputting the table of derivation elements;

an automaton producing unit 19 for producing a finite state automaton, in which each of the derivation types of the derivation elements produced by the producing unit 18 is used as a transition condition, from a set of combinations of regular expressions and applicable ranges of the number of sounds which are stored in the storing unit 17 and are selected by the producing unit 18 and outputting a list of state transitions for the finite state automaton;

a derivation type producing unit 20 for producing a plurality of derivation types respectively used in the producing unit 18 in a probability to derive a sound placed at a position of an expanded pronunciation character string from a remarked sound of an arbitrary question pronunciation character string;

a derivation type list number producing unit 21 for producing a plurality of derivation type list numbers to indicate one or more derivation type lists respectively composed of the same group of derivation types in the table of derivation elements by the same derivation type list number; and a classification number registering unit 22 for registering one or more classification numbers corresponding to one or more regular expressions stored in the storing unit 17.

In the classification number storing unit 22, a plurality of classification numbers are registered in list form. Also, one or more classification numbers are allocated for each of the pronunciation expanding rules filed in the file 14. Therefore, in cases where a classification number of one pronunciation expanding rule is registered in the registering unit 22, one or more regular expressions corresponding to the pronunciation expanding rule are transferred from the storing unit 17 to the producing unit 18, and the regular expressions are used in the producing unit 18.

In the derivation type producing unit 20, the derivation types are produced in a tabular form.

In the above configuration, an operation of the similar character string expanding apparatus 11 is described.

A plurality of pronunciation expanding rules to be filed in the pronunciation expanding rule file 14 are prepared in advance according to pronunciation similarity criteria. For example, five pronunciation expanding rules R1 to R5 shown in FIGS. 16A and 16B are produced from four pronunciation similarity criteria S1 to S4 shown in FIG. 3. That is, one interpretation of the pronunciation similarity criterion S1 is that an expanded pronunciation character string is produced by deleting a sound of a question pronunciation character string having two or more sounds in cases where the sound is listed in the weak sound table j0 and is placed at a position of the question pronunciation character string other than its top position. Therefore, a pronunciation expanding rule R1 composed of an applicable range of the number of sounds in a question pronunciation character string (from 2 to 10) and a regular expression <s0O+0>* <s0J+0> <s0O−1>* is manually obtained from the pronunciation similarity criterion S1.

In detail, a derivation type <s0O+0> indicates that a sound agreeing with a remarked sound of a question pronunciation character string is derived at the same position as that of the remarked sound as a derived sound of an expanded pronunciation character string without any derivative constraint, a derivation type <s0J+0> indicates that a sound agreeing with a remarked sound of a question pronunciation character string is derived at the same position as that of the remarked sound as a derived sound of an expanded pronunciation character string on condition that a sound placed at a position next to that of the remarked sound in the question pronunciation character string is listed in the weak sound table j0, and a derivation type <s0O−1> indicates that a sound agreeing with a remarked sound of a question pronunciation character string is derived at a position preceding to a position of the remarked sound by one as a derived sound of an expanded pronunciation character string without any derivative constraint. Therefore, a string of derivation types <s0J+0> <s0O−1> denotes that an expanded pronunciation character string in which a top sound is the same as a top sound of a question pronunciation character string and a second sound is the same as a third sound of the question pronunciation character string is produced on condition that a second sound of the question pronunciation character string is listed in the weak sound table j0, a string of derivation types <s0J+0> <s0O−1> <s0O−1> denotes that an expanded pronunciation character string in which a top sound is the same as a top sound of a question pronunciation character string, a second sound is the same as a third sound of the question pronunciation character string and a third sound is the same as a fourth sound of the question pronunciation character string is produced on condition that a second sound of the question pronunciation character string is listed in the weak sound table j0, a string of derivation types <s0O+0> <s0J+0> denotes that an expanded pronunciation character string in which a top sound is the same as a top sound of a question pronunciation character string and a second sound is the same as a second sound of the question pronunciation character string is produced on condition that a third sound of the question pronunciation character string is listed in the weak sound table j0, a string of derivation types <s0O+0> <s0J+0> <s0O−1> denotes that an expanded pronunciation character string in which a top sound is the same as a top sound of a question pronunciation character string, a second sound is the same as a second sound of the question pronunciation character string and a third sound is the same as a fourth sound of the question pronunciation character string is produced on condition that a third sound of the question pronunciation character string is listed in the weak sound table j0, a string of derivation types <s0O+0> <s0O+0> <s0J+0> denotes that an expanded pronunciation character string in which a top sound is the same as a top sound of a question pronunciation character string, a second sound is the same as a second sound of the question pronunciation character string and a third sound is the same as a third sound of the question pronunciation character string is produced on condition that a fourth sound of the question pronunciation character string is listed in the weak sound table j0, and a string of derivation types <s0O+0> <s0O+0> <s0J+0> <s0O0−1> denotes that an expanded pronunciation character string in which a top sound is the same as a top sound of a question pronunciation character string, a second sound is the same as a second sound of the question pronunciation character string, a third sound is the same as a third sound of the question pronunciation character string and a fourth sound is the same as a fifth sound of the question pronunciation character string is produced on condition that a fourth sound of the question pronunciation character string is listed in the weak sound table j0. Therefore, the regular expression <s0O+0>* <s0J+0> <s0O−1>* equivalent to a plurality of strings <s0J+0> <s0O−1>, <s0J+0> <s0O−1> <s0O−1>, <s0J+0> <s0O−1> <s0O−1> <s0O−1>, - - - , <s0O+0> <s0J+0>, <s0O+0> <s0J+0> <s0O−1>, <s0O+0> <s0J+0> <s0O−1> <s0O−1>, - - - , <s0O+0> <s0O+0> <s0J+0>, <s0O+0> <s0O+0> <s0J+0> <s0O−1>, <s0O+0> <s0O+0> <s0J+0> <s0O−1> <s0O−1>, - - - can be obtained.

Also, the other interpretation of the pronunciation similarity criterion S1 is that an expanded pronunciation character string is produced by inserting a sound listed in the weak sound table j0 in a question pronunciation character string to place the sound at a position of the expanded pronunciation character string other than its top position. Therefore, a pronunciation expending rule R2 composed of an applicable range of the number of sounds in a question pronunciation character string (from 1 to 9) and a regular expression <s0O+0> <s0O+0>* <j0O+1> <s0O+1>* is manually obtained from the pronunciation similarity criterion S1.

Also, the pronunciation similarity criterion S2 means that an expanded pronunciation character string is produced by replacing one sound of a question pronunciation character string with another sound listed in the weak different sound table j1. Therefore, a pronunciation expending rule R3 composed of an applicable range of the number of sounds in a question pronunciation character string (from 1 to 10) and a regular expression <s0O+0>* <j1O+0> <s0O+0>* is manually obtained from the pronunciation similarity criterion S2.

Also, the pronunciation similarity criterion S3 means that an expanded pronunciation character string is produced by replacing one sound of a question pronunciation character string with another sound listed in the same-line sound table d0. Therefore, a pronunciation expending rule R4 composed of an applicable range of the number of sounds in a question pronunciation character string (from 1 to 10) and a regular expression <s0O+0>* <d0O+0> <s0O+0>* is manually obtained from the pronunciation similarity criterion S3.

Also, the pronunciation similarity criterion S4 means that an expanded pronunciation character string is produced by replacing one sound of a question pronunciation character string having five or more sounds with one of sounds listed in the weak different sound table j1 and replacing another sound of the question pronunciation character string with one of sounds listed in the same-line sound table d0. Therefore, a pronunciation expending rule R5 composed of an applicable range of the number of sounds in a question pronunciation character string (from 1 to 10) and a regular expression <s0O+0>* {(<j1O+0> <s0O+0>* <d0O+0>)| (<d0O+0> <s0O+0>* <j1O+0>)} <s0O+0>* is manually obtained from the pronunciation similarity criterion S3.

The pronunciation expanding rules R1 to R5, the similar sound tables, and the definition of the derivation constraints "O" and "J" are filed in the pronunciation expanding rule file 14, as shown in FIG. 17. Here, the expression j0(a)="na", "nu" and "ru", for example, denotes that sounds "na", "nu" and "ru" are looked up in the weak sound table j0 by using a sound "a" as a key sound. The expression J=+0j0+1. denotes that the derivation constraint "J" is expressed by +0j0+1. The expression 2−10 <s0O+0>* <s0J+0> <s0O−1>* denotes a pronunciation expending rule instructing to expand and produce a plurality of expanded pronunciation character strings for a question pronunciation character string having sounds in the applicable range from 2 to 10 on condition that a plurality of strings of derivation types expressed by a regular expression <s0O+0>* <s0J+0> <s0O−1>* are annexed to a plurality of strings of sounds of the expanded pronunciation character strings.

Figures 19, 21:
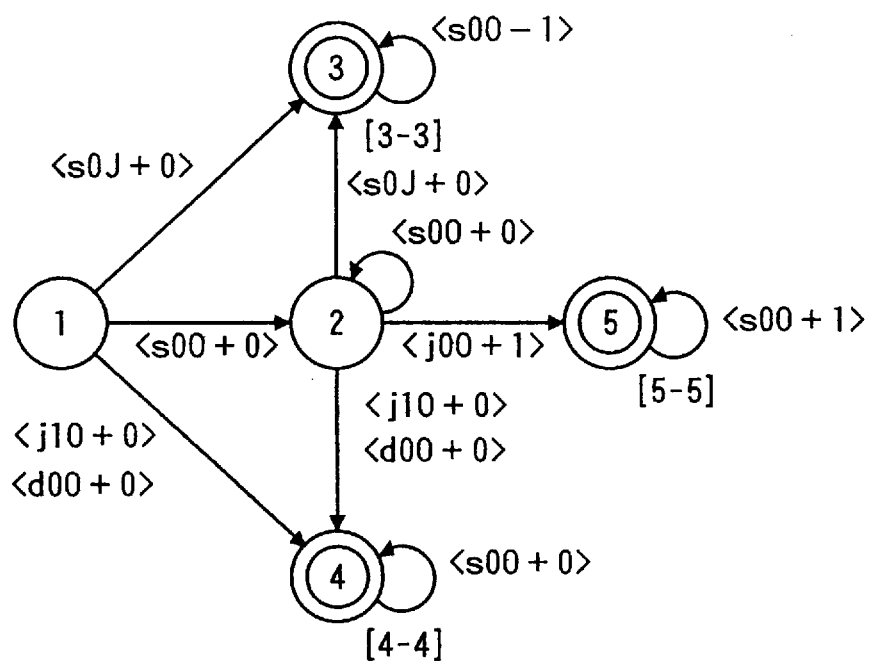
FIG. 19 shows a set of regular expression elements respectively composed of a regular expression and the number of sounds allowed for each of expanded pronunciation character strings derived from a question pronunciation character string.
FIG. 21 shows a deterministic finite state automaton produced in an automaton producing unit shown in FIG. 15.

Thereafter, the contents filed are read by the pronunciation expanding rule reading unit 15, the similar pronunciation tables are stored in the similar pronunciation table storing unit 16, and the definition of the derivation constraints and the pronunciation expanding rules are stored in the regular expression storing unit 17. Thereafter, when a question pronunciation character string "na-sho-na-ru" is, for example, input to the question pronunciation character string storing unit 12, the number of sounds in the question pronunciation character string is calculated, and the number of sounds is output to the derivation element producing unit 18. In the derivation element producing unit 18, a table of derivation elements Ed(Ps, Td, Sd) respectively composed of a sound position Ps, one or more derived sounds Sd placed at the same sound position Ps and one or more derivation types Td annexed to each of the derived sounds Sd is produced and output. A table of derivation elements Ed for the question pronunciation character string "na-sho-na-ru" is shown in FIG. 18 as an example. Also, a set of regular expression elements respectively composed of a regular expression and the number of sounds allowed for each of expanded pronunciation character strings derived from the question pronunciation character string according to the regular expression is produced by the producing unit 18 and output to the automaton generating unit 19. An example of the set of regular expression elements is shown in FIG. 19. A detail operation performed in the producing unit 18 is described with reference to FIG. 20.

FIG. 20 shows a flow chart showing an operation of the production of a table of one or more derivation elements Ed and a set of regular expressions.

As shown in FIG. 20, in a step S41, the number of sounds calculated by the calculating unit 13 is expressed by a symbol L, the number of pronunciation expanding rules filed in the file 14 is expressed by a symbol N, a variable i is initially set to 1, a set of position/derivation elements (Td,Ps) respectively composed of a derivation type Td and a sound position Ps is initially set to an empty set. The sound position Ps denotes a position of a sound in an expanded pronunciation character string, and the sound is derived according to the derivation type Td. In case of the question pronunciation character string "na-sho-na-ru", the number L of sounds is set to 4. Also, in cases where the pronunciation expanding rules R1 to R5 shown in FIGS. 16A and 16B are received from the regular expression storing unit 17, the number N is set to 5. Thereafter, in cases where the variable i is equal to or lower than the number N of pronunciation expanding rules in a step S42, an operation for the pronunciation expanding rule Ri is performed in steps S43 to S47.

In a step S43, the definition of the derivation constraints and the pronunciation expanding rule Ri expressed by a combination of an applicable range (from a lower sound number RLi to an upper sound number RUi) for the number L of sounds in the question pronunciation character string and a regular expression RE are transmitted from the regular expression storing unit 17 to the producing unit 18. In a step S44, it is judged whether or not the number L of sounds in the question pronunciation character string satisfies the applicable range.

In cases where the sound number L satisfies the applicable range (RLi≦L≦RUi), a difference Di in the number of sounds between the question pronunciation character string and each of expanded pronunciation character strings expanded according to the pronunciation expanding rule Ri is calculated in a step S45. The difference Di can be obtained from a final derivation type of the regular expression RE. In detail, a maximum value CC between the integral numbers "AA" and "BB" in the derivative constraint "Y"= "AAVVBB" applied for the final derivation type is calculated, the number "ZZ" of shifted sounds in the final derivation type <YXXZZ> is expressed by a value ZZ, the difference Di=ZZ is determined in case of CC<0, and the difference Di=ZZ-CC is determined in case of CC≧0. For example, in case of the regular expression RE=<s0O+0>*<s0J+0><s0O−1> of the pronunciation expanding rule R1, the difference D1 is calculated from the final derivation type <s0O−1>. Because the derivative constraint "Y" is O=+0s0+0, a maximum value CC=0 is calculated, the value ZZ=−1 is obtained, and the difference D1=−1 is determined. In the same manner, in case of the regular expression RE=<s0O+0><s0O+0>*<j0O+1><s0O+1>* of the pronunciation expanding rule R2, the final derivation type <s0O+1> is selected, a maximum value CC=0 is calculated, the value ZZ=+1 is obtained, and the difference D2=+1 is determined. In case of the regular expression RE=<s0O+0>*<j1O+0><s0O+0>* of the pronunciation expanding rule R3, the final derivation type <s0O+0> is selected, a maximum value CC=0 is calculated, the value ZZ=0 is obtained, and the difference D3=0 is determined. In case of the regular expression RE=<s0O+0>*<d0O+0><s0O+0>* of the pronunciation expanding rule R4, the final derivation type <s0O+0> is selected, a maximum value CC=0 is calculated, the value ZZ=0 is obtained, and the difference D4=0 is determined. In case of the regular expression RE=<s0O+0>*{(<j1O+0><s0O+0>*<d0O+0>)|(<d0O+0><s0O+0>*<j1O+0)}<s0O+0>* of the pronunciation expanding rule R4, the final derivation type <s0O+0> is selected, a maximum value CC=0 is calculated, the value ZZ=0 is obtained, and the difference D5=0 is determined.

Thereafter, in a step S46, the number Ns of sounds in each of the expanded pronunciation character strings is calculated according to an equation: Ns=L+Di. A regular expression element (Ns—Ns, RE) composed of a range Ns—Ns of the applicable sound number Ns and the regular expression RE relating to the pronunciation expanding rule Ri is transmitted to the automaton producing unit 19. In case of L=4, a regular expression element (3—3, <s0O+0>*<s0J+0><s0O−1>*) is transmitted to the automaton producing unit 19.

Thereafter, in a step S47, all position/derivation elements (Td,Ps) are obtained by analyzing the derivation types Td of the regular expression RE relating to the pronunciation expanding rule Ri. For example, in cases where a plurality of position/derivation elements are obtained by analyzing the derivation types <s0O+0>, <s0J+0> and <s0O−1> of the regular expression <s0O+0>*<s0J+0><s0O−1>* relating to the pronunciation expanding rule R1, the sound positions Ps ranges from 1 to Ns. Because the derivation type <s0J+0> is necessarily included in a string of derivation types indicating one expanded pronunciation character string, the sound positions Ps for the derivation type <s0O+0> ranges from 1 to Ns−1, and the sound positions Ps for the derivation type <s0O−1> ranges from 2 to Ns. The sound positions Ps for the derivation type <s0J+0> ranges from 1 to Ns. Therefore, all position/derivation elements (Td,Ps) for the pronunciation expanding rule R1 are as follows in case of the sound number L=4 in the question pronunciation character string: (<S0O+0>, 1), (<S0O+0>, 2), (<S0J+0>, 1), (<S0J+0>, 2), (<S0J+>, 3), (<S0O−1>, 2) and (<S0O−1>, 3).

The position/derivation elements (Td,Ps) are stored in a derivation set region of the derivation element producing unit 18, and the procedure proceeds to a step S48.

In contrast, in cases where RLi≦L≦RUi is not satisfied, the pronunciation expanding rule Ri is not considered, and the procedure jumps to the step S48. In the step S48, the variable i is incremented, and an operation for a next pronunciation expanding rule Ri is performed in steps S43 to S47 in the same manner. Therefore, a set of regular expression elements (Ns—Ns, RE) for one or more pronunciation expanding rules is transmitted to the automaton producing unit 19 and a set of position/derivation elements (Td,Ps) for the pronunciation expanding rules is stored in the derivation set region on condition that the number L of sounds in the question pronunciation character string is within an applicable range of each of the pronunciation expanding rules.

In case of L=4, regular expression elements (5—5, <s0O+0><s0O+0>*<J0O+1><s0O+1>*), (4—4, <s0O+0>*<j1O+0><s0O+0>*) and (4—4, <s0O+0>*<d0O+0><s0O+0>*) are transmitted to the automaton producing unit 19. In this case, because the sound number L=4 does not ranges from $RL_5$ to $RU_5$ in the step S44, the pronunciation expanding rule R5 is disregarded.

Also, all position/derivation elements (Td,Ps) for the regular expression <s0O+0><s0O+0>*<J0O+1><s0O+1>* of the pronunciation expanding rule R2 are as follows in case of the sound number L=4:
(<S0O+0>, 1), (<S0O+0>, 2), (<S0O+0>, 3), (<S0O+0>, 4), (<j0O+1>, 2), (<j0O+1>, 3), (<j0O+1>, 4), (<j0O+1>, 5), (<S0O+1>, 3), (<S0O+1>, 4) and (<S0O+1>, 5).

Also, all position/derivation elements (Td,Ps) for the regular expression <s0O+0>*<j1O+0><s0O+0>* of the pronunciation expanding rule R3 are as follows in case of the sound number L=4:
(<S0O+0>, 1), (<S0O+0>, 2), (<S0O+0>, 3), (<S0O+0>, 4), (<j1O+0>, 1), (<j1O+0>, 2), (<j1O+0>, 3) and (<j1O+0>, 4).

Also, all position/derivation elements (Td,Ps) for the regular expression <s0O+0>*<d0O+0><s0O+0>* of the pronunciation expanding rule R4 are as follows in case of the sound number L=4:
(<S0O+0>, 1), (<S0O+0>, 2), (<S0O+0>, 3), (<S0O+0>, 4), (<d0O+0>, 1), (<d0O+0>, 2), (<d0O+0>, 3) and (<d0O+0>, 4).

Therefore, 24 position/derivation elements (Td,Ps) are obtained as follows.
(<s0O+0>, 1), (<s0O+0>, 2), (<s0O+0>, 3), (<s0O+0>, 4), (<s0J+0>, 1), (<s0J+0>, 2),(<s0J+0>, 3), (<s0O−1>, 2), (<s0O−1>, 3), (<j0O+1>, 2), (<j0O+1>, 3), (<j0O+1>, 4), (<j0O+1>, 5), (<j1O+0>, 1), (<j1O+0>, 2), (<j1O+0>, 3), (<j1O+0>, 4), (<s0O+1>, 3), (<s0O+1>, 4), (<s0O+1>, 5), (<d0O+0>, 1), (<d0O+0>, 2), (<d0O+0>, 3) and (<d0O+0>, 4).

In cases where the variable i exceeds the number N in the step S42, the procedure proceeds to a step S49. In the step S49, the number M of position/derivation elements (Td,Ps) stored in the derivation set region is calculated, a variable j is initially set to 1, and a set of derivation elements stored in a derivation element storing region of the derivation element producing unit 18 is initially set to an empty set. The position/derivation elements (Td,Ps) are numbered from first to M-th.

Thereafter, in cases where the variable j is equal to or lower than the number M of position/derivation elements in a step S50, it is judged that at least a j-th position/derivation element is not processed in steps S51 to S58. Therefore, the j-th position/derivation element (Td,Ps) composed of a particular sound position Ps and a particular derivation type Td is read out from the derivation set region in a step S51 to add the j-th position/derivation element (Td,Ps) to a table of derivation elements in steps S52 to S58. In a step S52, all types of particular derived sounds placed at the same particular sound position Ps of the j-th position/derivation element (Td,Ps) are found out by using the question pronunciation character string stored in the storing unit 12, the particular derivation types Td of the j-th position/derivation element (Td,Ps) and the similar sound tables stored in the storing unit 16. Thereafter, in a step S53, the number Q of types of particular derived sounds is calculated, and a variable k is initially set to 1. The types of particular derived sounds found out are numbered.

In cases where the variable k is equal to or lower than the number Q in a step S54, because a k-th type of particular derived sound is not processed in steps S55 to S58, the k-th type of particular derived sound is expressed by a symbol Sd in a step S55 for convenience, and it is judged whether or not a particular derivation element Ed relating to the particular sound position Ps and the particular derived sound Sd exists in a table of derivation elements. In cases where the particular derivation element Ed exists in the table, the particular derivation type Td is added to the particular derivation element Ed in a step S57. In contrast, in cases where the particular derivation element Ed does not exist in the table, a derivation element Ed(Ps, Td, Sd) composed of the particular sound position Ps, the particular derivation type Td and the particular derived sound Sd is added to the table of derivation elements in a step S58. Thereafter, the variable k is incremented in a step S59, and a next k-th type of particular derived sound Sd is processed in the steps S55 to S58 in the same manner.

When it is judged in the step S54 that all types of particular derived sounds Sd found out in the step S52 are processed, the variable j is incremented in a step S60, a next j-th position/derivation element (Td,Ps) is read out from the derivation set region in the step S51, and the j-th position/derivation element (Td,Ps) is added to the table of derivation elements in steps S52 to S58 in the same manner. When the variable j exceeds the number M in the step S50, it is judged that all position/derivation elements (Td,Ps) stored in the derivation set region are processed in the steps S51 to S58, and the procedure proceeds to a step S61. In the step S61, in cases where a plurality of derivation elements Ed(Ps, Td, Sd) respectively relating to the same sound position Ps and the same derivation type (or types) Td exist on condition that a plurality of derived sounds Sd exist in the derivation elements Ed(Ps, Td, Sd), the derivation elements Ed(Ps, Td, Sd) are unified to a derivation element Ed(Ps, Td, Sd) composed of the sound position Ps, the derivation type (or types) Td and the derived sounds Sd. Therefore, a table of derivation elements Ed(Ps, Td, Sd) shown in FIG. 18 as an example is output from the producing unit 18.

Thereafter, in the automaton producing unit 19, a deterministic finite state automaton expressed by a state-transition view shown in FIG. 21 is produced from the set of regular expression elements (Ns—Ns, RE) produced by the producing unit 18. In FIG. 21, circles indicate intermediate states, double circles indicate final states, numbers placed in the circles and double circles are respectively called a state number. In cases where a first regular expression element (3—3, <s0O+0>*<s0J+0><s0O−1>*) shown in FIG. 19 is applied, a state-transition from the state 1 to the state 3 or a state-transition from the state 1 to the state 3 through the state 2 is performed. In cases where a second regular expression element (5—5, <s0O+0><s0O+0>*<j0O+1><s0O+1>*) shown in FIG. 19 is applied, a state-transition from the state 1 to the state 5 through the state 2 is performed. In cases where a third regular expression element (4—4, <s0O+0>* <j1O+0><s0O+0>*) shown in FIG. 19 is applied, a state-transition from the state 1 to the state 4 through the state 2 is performed. In cases where a fourth regular expression element (4—4, <s0O+0>*<d0O+0><s0O+0>*) shown in FIG. 19 is applied, a state-transition from the state 1 to the state 4 through the state 2 is performed.

Thereafter, a state-transition table equivalent to the deterministic finite state automaton is produced by the automaton producing unit 19 and is output from the producing unit 19. That is, all regular expressions of the set of regular expression elements are connected to logically sum the regular expressions, and a unified regular expression is produced. Thereafter, the unified regular expression is transformed to the deterministic finite state automaton according to a well-known subset constructing method.

Figures 22, 23:
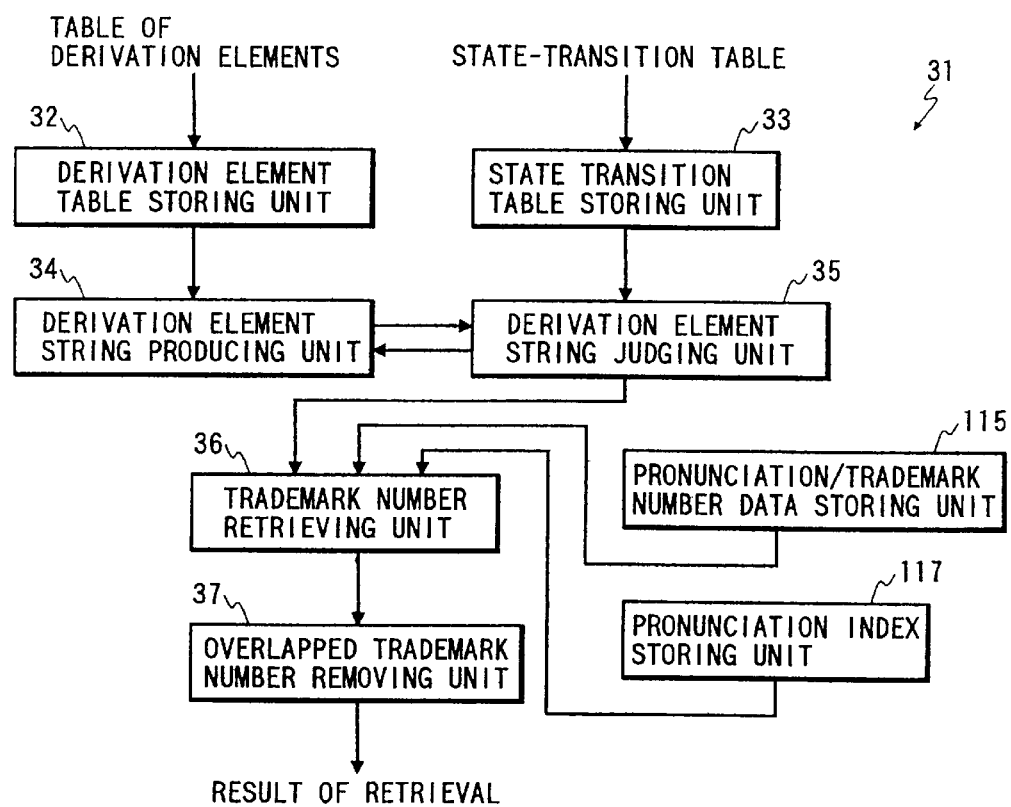
FIG. 22 shows a state-transition table equivalent to the deterministic finite state automaton shown in FIG. 21.
FIG. 23 is a block diagram of a character string (or name) retrieving apparatus in which one or more names agreeing with one or more similar pronunciation character string indirectly indicated by the similar character string expanding apparatus shown in FIG. 15 are retrieved according to a second embodiment of the present invention.

The state-transition table is shown in FIG. 22 as an example. As shown in FIG. 22, as an example, in cases where a top sound of an expanded pronunciation character string is derived from a remarked sound of the question pronunciation character string according to a derivation type <s0O+0> treated as a transition condition when the automaton is placed to the initial state 1, a state-transition from the initial state 1 to the state 2 is performed in the automaton. Thereafter, in cases where a second sound of the expanded pronunciation character string is derived according to a derivation type <s0O+0>, the state of the automaton keeps the state 2, and a third sound of the expanded pronunciation character string is derived according to a derivation type <s0J+0> by performing a state-transition from the state 2 to the state 3. In contrast, in cases where a second sound of the expanded pronunciation character string is derived according to a derivation type <s0J+0>, a state-transition from the state 2 to the state 3 is performed in the automaton, and a third sound of the expanded pronunciation character string is derived according to a derivation type <s0O−1> while keeping the state of the automaton to the state 3. Therefore, the expanded pronunciation character strings having three sounds are obtained.

Accordingly, the table of derivation elements and the state-transition table indicating a plurality of expanded pronunciation character strings similar in pronunciation to the question pronunciation character string can be output from the similar character string expanding apparatus 11 without directly outputting the expanded pronunciation character strings (or the similar pronunciation character strings). Therefore, even though millions of similar pronunciation character strings exist, because the similar pronunciation character strings are not directly output and the table of derivation elements and the state-transition table are output, an output volume can be considerably reduced.

Also, all pronunciation expanding rules are not separately applied but are applied in a group in the production of the deterministic finite state automaton and the state-transition table. Therefore, even though tens of pronunciation expanding rules are required to be applied and millions of similar pronunciation character strings exist, the table of derivation elements and the state-transition table in which tens of pronunciation expanding rules are applied in a group can be obtained at a short time.

Also, each of a plurality of pronunciation expanding rules can be simply indicated by a combination of an applicable range of the number of sounds and a regular expression, and the pronunciation expanding rules can be arbitrarily filed in the file 14. That is, the filing of the pronunciation expanding rules is not fixed. Therefore, even though one or more pronunciation similarity criteria are altered, a plurality of pronunciation expanding rules corresponding to the altered pronunciation similarity criteria can be promptly filed in the file 14 without any troublesomeness.

In cases where the derivation type producing unit 20 is used, a plurality of derivation types are produced in advance to derive a plurality of sounds placed at a plurality of positions of a plurality of expanded pronunciation character strings from a plurality of remarked sounds of various question pronunciation character strings having different sound lengths. Therefore, the derivation types listed in the table of derivation elements produced by the storing unit 18 are transmitted from the derivation type producing unit 20.

In cases where the derivation type list number producing unit 21 is used, a plurality of derivation type list numbers numbered in series are respectively attached to a list of one or more derivation types of a derivation element produced by the producing unit 18. Therefore, the derivation type list numbers are used as transition conditions in the deterministic finite state automaton in place of the derivation types.

In cases where the classification number registering unit 22 is used, one or more regular expressions stored in the storing unit 17 are selectively transferred to the producing unit 18 on condition that one or more classification numbers allocated for one or more pronunciation expanding rules relating to the selected regular expressions are registered in the registering unit 22, and a table of derivation elements and a set of regular expression elements are produced in the producing unit 18 by considering the selected regular expressions.

In the above embodiment, the derivation elements in the table shown in FIG. 18 are determined in the order in which the number of the sound position is increased. However, the order that the derivation elements are determined is not limited.

Also, a position of a remarked sound in the question pronunciation character strings is indicated by an absolute position to obtain each of the derivation elements. However, it is applicable that a position of a remarked sound in the question pronunciation character string be indicated by a relative position to a position of a derived sound in an expanded pronunciation character string. Also, the derivative constraint defined in this embodiment is not limited. That is, it is applicable that the definition of the derivative constraint depend on only a question pronunciation character string regardless of any expanded pronunciation character string.

Next, a second embodiment, in which one or more names (or trademarks) agreeing with one or more expanded pronunciation character strings similar in pronunciation to a question pronunciation character string (or one or more similar pronunciation character strings) are retrieved by using the table of derivation elements output from the derivation element producing unit 18 and the state-transition table output from the automaton producing unit 19, is described.

FIG. 23 is a block diagram of a character string (or name) retrieving apparatus in which one or more names agreeing with one or more similar pronunciation character string indirectly indicated by the similar character string expanding apparatus 11 are retrieved according to a second embodiment of the present invention.

As shown in FIG. 23, a character string retrieving apparatus 31 comprises a derivation element table storing unit 32 for storing the table of derivation elements output from the derivation element producing unit 18 in tabular form, a state transition table storing unit 33 for storing the state-transition table output from the automaton producing unit 19 in tabular form, a derivation element string producing unit 34 for producing a string of derivation elements arranged in order of the sound position from the table of derivation elements stored in the derivation element table storing unit 32 while increasing the number of derivation elements in the string one by one, a derivation element string judging unit 35 for judging whether or not the string of derivation elements produced by the derivation element string producing unit 34 satisfies state-transition conditions and the range Ns—Ns of the applicable sound number indicated by the state-transition table stored in the state transition table storing unit 33 to judge whether or not the string of derivation elements satisfies the pronunciation expanding rules (for example, shown in FIGS. 16A and 16B) used in the similar character string expanding apparatus 11, the pronunciation/trademark number data storing unit 115, the pronunciation index storing unit 117, a trademark number retrieving unit 36 for receiving one or more strings of derivation elements satisfying the pronunciation expanding rules from the derivation element string judging unit 35, extracting a string of derived sounds arranged in order of the sound position from each of the strings of derivation elements, retrieving one or more pronunciation numbers corresponding to the strings of derived sounds from the pronunciation index storing unit 117, retrieving one or more trademark numbers corresponding to the pronunciation numbers from the pronunciation/trademark number data storing unit 115, and an overlapped trademark number removing unit 37 for changing a plurality of overlapped trademark numbers, which are retrieved by the trademark number retrieving unit 36 and have the same number, to one trademark number and outputting one or more trademark numbers not overlapped each other as a result of retrieval.

In the derivation element table storing unit 32, a plurality of derivation elements are stored in tabular form to arrange the derivation elements in order of the sound position at high speed. In the state transition table storing unit 33, the state-transition table is stored in tabular form to obtain one or more succeeding states from a current state and one or more derivation types allowed for the current state at high speed.

In the above configuration, when a string which is composed of one or more derivation elements arranged in order of the sound position is produced in the producing unit 34 by extracting the derivation elements stored in the derivation element table storing unit 32 one by one, it is judged by the judging unit 35 whether or not the string of derivation elements satisfies state-transition conditions and the range Ns—Ns of the applicable sound number indicated by the state-transition table stored in the state transition table storing unit 33. In cases where the string does not satisfy the state-transition conditions or the range Ns—Ns of the applicable sound number, another string is produced in the producing unit 34. In contrast, in cases where the string satisfies the state-transition conditions or the range Ns—Ns of the applicable sound number, a string of derived sounds is produced from the string of derivation elements in the retrieving unit 36, and one or more trademark numbers corresponding to the string of derived sounds are retrieved. The above operation is repeated to produce, in the producing unit 34, all strings of derivation elements obtained by combining the derivation elements in order of the sound position. Thereafter, a plurality of overlapped trademark numbers are changed to one trademark number in the removing unit 37, and one or more trademark numbers having no overlapped trademark number are output.

Figure 24:
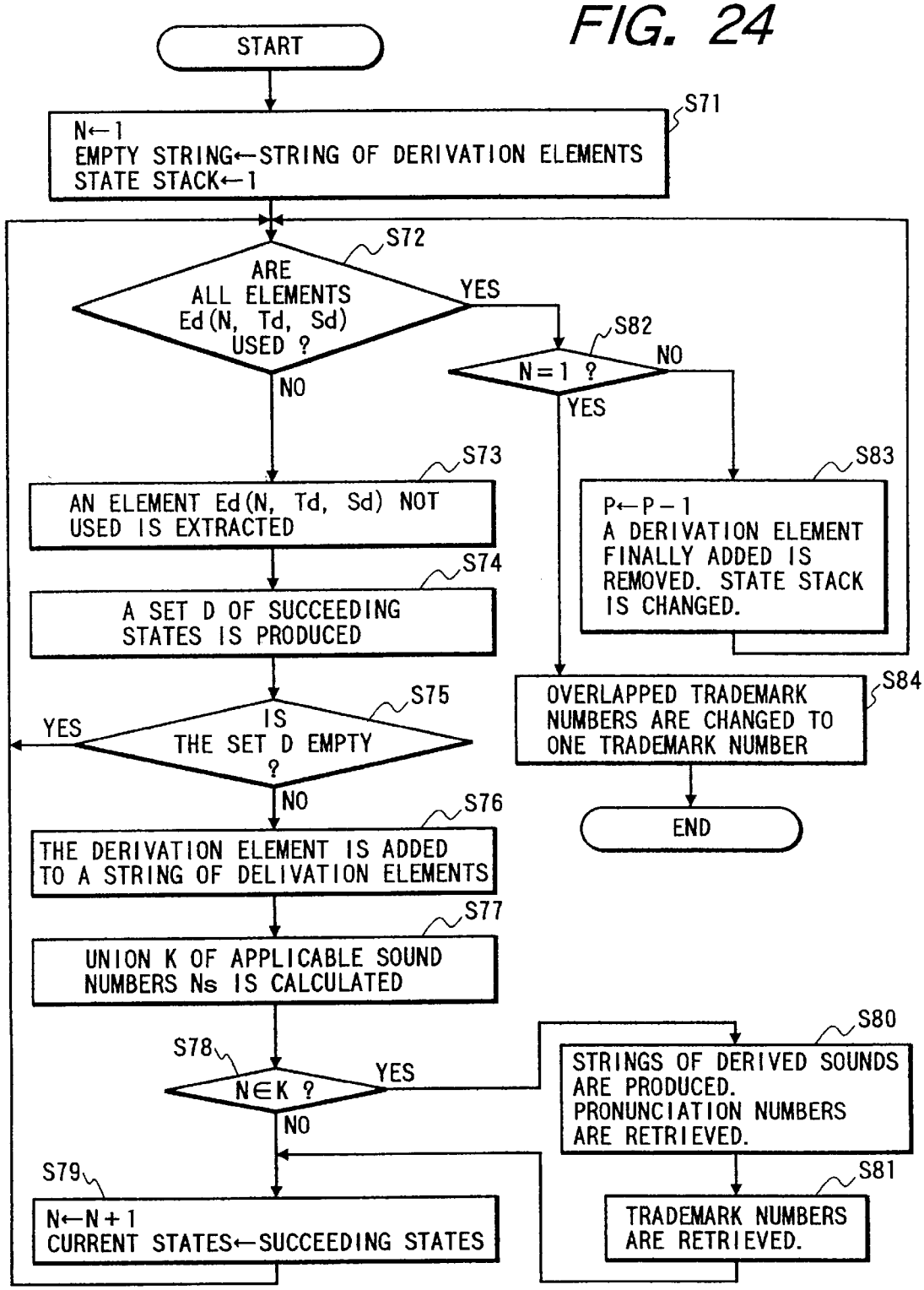
FIG. 24 is a flow chart of an operation performed in the character string retrieving apparatus shown in FIG. 23.

The operation of the character string retrieving apparatus 31 is described in detail with reference to FIG. 24 on condition that the question pronunciation character string "na-sho-na-ru" and the pronunciation expanding rules R1 to R5 are used in the expanding apparatus 11.

In a step S71, a string of derivation elements produced in the producing unit 34 is initially set to an empty string, the number N of derivation elements in the string is initially set to 1, and a state stack indicating a current state is initially set to "1". The state stack "1" indicates that the current state is set to the first state.

In a step S72 of a first cycle, it is judged whether or not all derivation elements Ed(N, Td, Sd) relating to the N-th sound position have been respectively used to produce a set of derivation elements. In cases where a derivation element relating to the N-th sound position has not been used, the derivation element is extracted from the table of derivation elements stored in the storing unit 32 and is transmitted to the judging unit 35 through the producing unit 34 as a candidate for the N-th sound position in a step S73. Because any derivation element relating to the first (or top) sound position is not used to produce a set of derivation elements, a derivation element (1, <s0O+0>, "na") is transmitted to the judging unit 35 as a first candidate for the first sound position in the step S73.

Thereafter, in a step S74, one or more succeeding states obtained by performing one or more state-transitions from the current state for one or more derivation types of the derivation element are determined according to the state-transition table stored in the storing unit 33, and a set D of the succeeding states is produced. Because the derivation element has only the derivation type <s0O+0>, the set D composed of the second state is obtained.

Thereafter, in a step S75, it is judged by the judging unit 35 whether or not the set D is empty. In cases where the set D is empty, the procedure returns to the step S72 because any succeeding state does not exist, and a next derivation element relating to the N-th sound position is extracted from the storing unit 32 as a next candidate for the N-th sound position. In contrast, in cases where the set D is not empty, the derivation element extracted in the step S73 is added to the string of derivation elements as a final derivation element in the string in the producing unit 34 (step S76), and a string of derivation elements is newly produced. Because the set D is composed of the second state, the derivation element (1, <s0O+0>, "na") is added to the string of derivation elements in the step S76.

Thereafter, in a step S77, the applicable sound number Ns is obtained for each of the succeeding states of the set D according to the state-transition table stored in the storing unit 33, and a union K of the applicable sound numbers Ns for the succeeding states of the set D is calculated in the judging unit 35. Because the succeeding state of the set D is the second state and any applicable sound number is not defined for the second state, the union K is empty.

Thereafter, it is judged by the judging unit 35 whether or not the number N of derivation elements in the string is included in the union K (step S78). In cases where the number N is not included in the union K, it is judged that any similar pronunciation character string is not obtained from the string of derivation elements because the range Ns—Ns of the applicable sound number indicated by the state-transition table is not satisfied, and the procedure proceeds to a step S79. Because the union K is empty, the number N=1 is not included in the union K.

In the step S79, the number N is incremented to form another string of derivation elements, the succeeding states of the set D are pushed in the state stack to set the succeeding states as one or more current states newly determined, and the procedure returns to the step S72. That is, the number N is set to 2, and the second state is set to the current state.

In the step S72 of a second cycle, because any derivation element relating to the second sound position (N=2) is not used, a derivation element (2, <s0O+0>, <s0J+0>, "sho") is transmitted to the judging unit 35 as a first candidate for the second sound position in the step S73, a set D composed of the second state and the third state is produced in the step S74 because the derivation types <s0O+0> and <s0J+0> exist in the derivation element, and the derivation element (2, <s0O+0>, <s0J+0>, "sho") is added to the string of derivation elements in the step S76 because the set D is not empty. Thereafter, because the applicable sound number Ns=3 is defined for the third state though any applicable sound number is not defined for the second state, a union K composed of the applicable sound number Ns=3 is produced in the step S77, and the procedure proceeds to the step S79 because the number N=2 is not included in the union K. That is, a retrieving operation for retrieving a pronunciation character string "na-sho" obtained by connecting the derivation types <s0O+0> and <s0O+0> (or <s0J+0>) of the derivation elements in the string in that order is not performed in the trademark number retrieving unit 36. In the step S79, the number N is set to 3, and the second and third states of the set D is set to the current states.

In the step S72 of a third cycle, because any derivation element relating to the third sound position (N=3) is not used, a derivation element (3, <s0O+0>, <s0J+0>, <j0O+1>, "na") is transmitted to the judging unit 35 as a first candidate for the third sound position in the step S73, the second state is obtained by a string of derivation types <s0O+0><s0O+0><s0O+0>, the third state is obtained by a string of derivation types <s0O+0><s0O+0><s0J+0>, and the fifth state is obtained by a string of derivation types <s0O+0><s0O+0><j0O+1>. Therefore, a set D composed of the second state, the third state and the fifth state is produced in the step S74, and the derivation element (3, <s0O+0>, <s0J+0>, <j0O+1 >, "na") is added to the string of derivation elements in the step S76 because the set D is not empty. Thereafter, a union K composed of the applicable sound numbers Ns=3 and 5 is produced in the step S77, and the procedure proceeds to a step S80 because the number N=3 is included in the union K.

In the step S80, one or more strings of derived sounds are produced in the retrieving unit 36 by connecting N derived sounds of the derivation elements extracted in the step S73 in order of the sound position, and one or more pronunciation numbers corresponding to the strings of derived sounds are retrieved from the pronunciation index storing unit 117. Because a string of derived sounds "na-sho-na" is produced by connecting the derived sounds of the three derivation elements, a pronunciation number "8" is retrieved from the storing unit 117. Thereafter, in a step S81, one or more trademark numbers corresponding to the pronunciation number are retrieved from the pronunciation/trademark number data storing unit 115 in the retrieving unit 36, and the trademark numbers are stored in a retrieval result storing region. Because the pronunciation number "8" is retrieved, the trademark numbers "1100359" and "1101022" are obtained.

Thereafter, in the step S79, the number N is set to 4, and the second, third and fifth states of the set D is set to the current states.

In the steps S72 to S79 of a fourth cycle, a set D composed of the second state corresponding to a string of derivation types <s0O+0><s0O+0><s0O+0><s0O+0> and the fifth state corresponding to a string of derivation types <s0O+0><s0O+0><s0O+0><j0O+1> is produced, the derivation element (4, <s0O+0>, <j0O+1>, "ru") is added to the string of derivation elements as a first candidate for the fourth sound position, the number N is set to 5, and the second and fifth states of the set D is set to the current states.

In the same manner, the derivation element (5, <s0O+0>, <j0O+1>, "ru") is added to the string of derivation elements as a first candidate for the fifth sound position in the steps S72 to S78 of a fifth cycle, and the number N is set to 6 in the step S79 of the fifth cycle. Because any derivation element relating to the sixth sound position (N=6) does not exist in the table of derivation elements, the procedure proceeds to a step S82.

In the step S82, it is judged whether or not the number N is reduced to 1 after the number N is maximized. In cases where the number N is not equal to 1, the procedure proceeds to a step S83. In the step S83, the number N is reduced by 1, the derivation element finally added to the string of derivation elements is removed from the string to add another candidate to the string, and the condition of the state stack is changed to set the succeeding states for the reduced number N as the current states. Because of the number N=6, the number N is reduced to N=5 in the step S83, the derivation element (5, <s0O+0>, <j0O+1>, "ru") is removed from the string, and the second and fifth states are set as the current states.

Thereafter, in the steps S72 to S79 of a sixth cycle, the derivation element (5, <j0O+1>, "na", "nu") is added to the string of derivation elements obtained in the fourth cycle as a second candidate for the fifth sound position, and the number N is set to 6. Thereafter, in the steps S82 and S83, the number N is reduced to 5, and the derivation element (5, <j0O+1>, "na", "nu") is removed from the string.

Thereafter, because all derivation elements relating to the fifth sound position are used, the number N is reduced to 4, and the derivation element (4, <s0O+0>, <j0O+1>, "ru") is removed from the string in the steps S82 and S83.

Thereafter, each of remaining derivation elements relating to the fourth sound position and each of the derivation elements relating to the fifth sound position are added to the string of derivation elements produced in the third cycle in the same manner. In cases where the derivation elements (1, <s0O+0>, "na"), (2, <s0O+0>, <s0J+0>, "sho"), (3, <s0O+0>, <s0J+0>, <j0O+1>, "na") and (4, <d0O+0>, "ra", "ri", "re", "ro") are added to the string of derivation elements in that order while performing the state-transitions (first state→second state→second state→fourth state), the string of derivation elements satisfies the state-transition table because a string of derivation types <s0O+0><s0O+0><s0O+0><d0O+0> can be produced from the string of derivation elements (or the set D is not empty) and the number 4 is included in the union K having the fourth state as the succeeding state. Therefore, in the steps S80 and S81, a plurality of strings of derived sounds "na-sho-na-ra", "na-sho-na-ri", "na-sho-na-re" and "na-sho-na-ro" are produced, a pronunciation number 9 is retrieved, and a trademark number "1101022" is obtained.

After all derivation elements relating to the fourth sound position are used in the steps S72 to S79, S82 and S83, remaining derivation elements relating to the third sound position are used in the steps S72 to S79, S82 and S83. After all derivation elements relating to the third sound position are used in the steps S72 to S79, S82 and S83, remaining derivation elements relating to the second sound position are used in the steps S72 to S79, S82 and S83. In cases where the derivation elements (1, <s0O+0>, "na"), (2, <d0O+0>, "sha", "shu"), (3, <s0O+0>, <s0J+0>, <j0O+1>, "na") and (4, <s0O+0>, <j0O+1>, "ru") are added to the string of derivation elements in that order while performing the state-transitions (first state→second state→fourth state→fourth state), the string of derivation elements satisfies the state-transition table because a string of derivation types <s0O+0><d0O+0><s0O+0><s0O+0> can be produced from the string of derivation elements (or the set D is not empty) and the number 4 is included in the union K having the fourth state as the succeeding state. Therefore, in the steps S80 and S81, a plurality of strings of derived sounds "na-sha-na-ru" and "na-shu-na-ru" are produced, a pronunciation number 7 is retrieved, and a trademark number "1113044" is obtained.

After all derivation elements relating to the second sound position are used in the steps S72 to S79, S82 and S83, remaining derivation elements relating to the first sound position are used in the steps S72 to S79, S82 and S83. In cases where the derivation elements (1, <d0O+0>, "ni"), (2, <s0O+0>, <s0J+0>, "sho"), (3, <s0O+0>, <s0J+0>, <j0O+1>, "na") and (4, <s0O+0>, <j0O+1>, "ru") are added to the string of derivation elements in that order while performing the state-transitions (first state→fourth state→fourth state→fourth state), the string of derivation elements satisfies the state-transition table because a string of derivation types <d0O+0><s0O+0><s0O+0><s0O+0> can be produced from the string of derivation elements (or the set D is not empty) and the number 4 is included in the union K having the fourth state as the succeeding state. Therefore, in the steps S80 and S81, a plurality of strings of derived sounds "ni-sho-na-ru", "ne-sho-na-ru" and "no-sho-na-ru" are produced, a pronunciation number 14 is retrieved, and two trademark numbers "1101492" and "1106430" are obtained.

After all derivation elements relating to the first sound position are used in the steps S72 to S79, S82 and S83, it is judged in the step S82 that the number N is 1 after the number N is reduced in the step S83, and the procedure proceeds to a step S84. In the step S84, the trademark numbers stored in the retrieval result storing region in the step S81 are sent to the removing unit 37, a plurality of overlapped trademark numbers are changed to one trademark number in the removing unit 37, and one or more trademark numbers having no overlapped trademark number are output as a result of retrieval. Because the trademark numbers "1100359", "1101022", "1101022", "1113044", "1101492" and "1106430" are stored in the retrieval result storing region in the step S81, the overlapped trademark numbers "1101022" and "1101022" are changed to one trademark number "1101022" in the removing unit 37, and the trademark numbers "1100359", "1101022", "1113044", "1101492" and "1106430" are output from the retrieving apparatus 31.

Accordingly, because one or more trademark numbers corresponding to one or more trademarks are retrieved from the trademark data base 112 through the storing units 115 and 117 by using the table of derivation elements and the state-transition table output from the expanding apparatus 11 without directly using a plurality of expanded pronunciation character strings similar in pronunciation to the question pronunciation character string (or a plurality of similar pronunciation character strings), even though millions of similar pronunciation character strings and millions of trademarks exist, the retrieval of the trademarks similar in pronunciation to the question pronunciation character string can be performed at high speed.

In the character string retrieving apparatus 31, one or more trademark numbers corresponding to one or more trademarks are retrieved as one or more character strings (or names) to retrieve one or more registered trademarks similar to a questioned trademark. However, the character string retrieving apparatus 31 can be generally applied for retrieving one or more character strings similar to a questioned character string. For example, even though names such as organic compounds, place names, person names, names of books or the like are registered in a data base, one or more names similar to a questioned character string can be obtained at high speed by using the expanding apparatus 11 and the retrieving apparatus 31.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A similar character string expanding method, comprising the steps of:

preparing one or more similar sound tables according to a plurality of pronunciation similarity criteria, each of the similar sound tables indicating one or more similar sounds similar in pronunciation to one key sound for each of a plurality of key sounds;

preparing a regular expression and an applicable range according to each of the pronunciation similarity criteria, each of the regular expressions indicating one or more strings of derivation types, each of derivation types indicating how each of a plurality of derived sounds placed at positions of an expanded pronunciation character string is derived from a remarked sound placed at a remarked position of a remarked pronunciation character string, and the number of sounds in the remarked pronunciation character string being within a corresponding applicable range;

receiving a question pronunciation character string;

producing a set of derivation elements for the question pronunciation character string according to the similar sound tables and the regular expressions corresponding to the pronunciation similarity criteria, each of the derivation elements in the set being composed of a derived sound derived from one of a plurality of sounds in the question pronunciation character string, a sound position of the derived sound in each of one or more expanded pronunciation character strings expanded from the question pronunciation character string and a list of one or more derivation types respectively used to derive the derived sound at the sound position of each expanded pronunciation character string, and the derivation types being extracted from the strings of derivation types indicated by each of the regular expressions prepared;

producing a set of a plurality of regular expression elements respectively composed of one regular expression and an applicable sound number, the applicable sound number indicating the number of sounds in each of one or more expanded pronunciation character strings expanded from the question pronunciation character string;

producing a finite state automaton indicating one or more applicable strings of derivation types from the set of regular expression elements, each applicable string of derivation types being indicated by one regular expression of one regular expression element on condition that the number of sounds in an expanded pronunciation character string expanded from the question pronunciation character string according to the applicable string of derivation types agrees with one applicable sound number of the regular expression element; and outputting the set of derivation elements and the finite state automaton to expand one or more expanded pronunciation character strings as one or more similar pronunciation character strings similar in pronunciation to the question pronunciation character string according to the set of derivation elements and the finite state automaton.

2. A similar character string expanding method according to claim 1, in which the step of outputting the set of derivation elements and the finite state automaton comprises the steps of:

selecting a plurality of derived types from the set of derivation elements in increasing order of sound positions corresponding to the derived types on condition that one applicable string indicated by the finite state automaton is formed by the derived types; and serially arranging a plurality of derived sounds of the set of derivation elements corresponding to the derived types in correspondence order to form one expanded pronunciation character string corresponding to one applicable string indicated by the finite state automaton.

3. A similar character string expanding method according to claim 1, in which the step of preparing a regular expression and an applicable range includes the step of:

making up each of the derivation types of a first symbol identifying one of the similar sound tables, a second symbol specifying a positional difference between a remarked position of one remarked sound placed in the remarked pronunciation character string and a derived position of one derived sound which is looked up in the similar sound table identified by the first symbol by using the remarked sound as one key sound and is placed in the expanded pronunciation character string, and a third symbol indicating a derivation constraint for the remarked sound.

4. A similar character string expanding method according to claim 3, in which the step of producing a set of derivation elements comprises the steps of:

extracting a derivation type from a string of derivation types indicated by one of the regular expressions;

selecting a remarked sound from among a plurality of sounds in the question pronunciation character string;

judging whether or not the remarked sound satisfies a derivation constraint of the derivation type;

determining a sound position according to a remarked position of the remarked sound in the question pronunciation character string and a positional difference of the derivation type in cases where the remarked sound satisfies the derivation constraint;

looking up one or more similar sounds in a similar sound table identified by an identifying symbol of the derivation type by using the remarked sound as a key sound;

determining each of the similar sounds as a derived sound in cases where the remarked sound satisfies the derivation constraint;

producing a derivation element composed of the sound position, the derivation type and the derived sound; and registering the derivation element in the set of derivation elements.

5. A similar character string expanding method according to claim 3, in which the step of making up each of the derivation types include the step of:

judging whether or not a remarked sound in the question pronunciation character string satisfies a derivation constraint of a derivation type according to a plurality of sounds in the question pronunciation character string regardless of any expanded pronunciation character string.

6. A similar character string expanding method according to claim 1, in which the step of preparing one or more similar sound tables includes the step of;

preparing a same sound table indicating a sound which is the same as one key sound as a similar sound for each of the key sounds;

preparing a weak sound table indicating one or more weak sounds which is the same as or similar to one key sound as one or more similar sounds for each of the key sounds;

preparing a weak different sound table indicating one or more weak sounds similar in pronunciation to one key sound as one or more similar sounds for each of the key sounds; and preparing a same-line sound table indicating a plurality of sounds, which are placed in the same line as that of one key sound, as a plurality of similar sounds for each of the key sounds.

7. A similar character string expanding method according to claim 1, in which the step of producing a set of derivation elements includes the steps of:

producing various predetermined derivation types required in a probability to determine a plurality of derived sounds from a plurality of remarked sounds of various remarked pronunciation character strings; and selecting the derivation types in the set of derivation elements from among the predetermined derivation types.

8. A similar character string expanding method according to claim 1, in which the step of producing a finite state automaton includes the steps of:

producing a plurality of derivation type list numbers;

indicating one or more derivation type lists respectively composed of the same group of derivation types in the set of derivation elements by the same derivation type list number; and indicating each of the applicable strings of derivation types indicated by the finite state automaton by a string of derivation type list numbers.

9. A similar character string expanding method according to claim 1, in which the step of producing a set of derivation elements comprises the steps of:

producing a plurality of derivation elements in the order in which the number of the sound position is increased; and adding the derivation elements one after another in a set.

10. A similar character string expanding method according to claim 1, in which the step of producing a set of derivation elements comprises the steps of:

indicating a remarked position of a remarked sound in the question pronunciation character string by a relative position to a sound position of a derived sound in an expanded pronunciation character string;

determining the sound position of the derived sound;

determining a derivation element relating to the sound position of the derived sound; and adding the derivation elements one after another in a set.

11. A similar character string expanding method according to claim 1, in which the step of producing a set of a plurality of regular expression elements comprises the steps of:

selecting one or more particular regular expressions from the regular expressions, the number of sounds in the question pronunciation character string being within each of one or more applicable ranges corresponding to the particular regular expressions;

determining each of the applicable sound numbers according to one corresponding particular regular expression and the number of sounds in the question pronunciation character string; and producing the regular expression elements respectively composed of one particular regular expression and one applicable sound number corresponding to the particular regular expression.

12. A similar character string expanding apparatus, comprising:

similar sound table storing means for storing one or more similar sound tables prepared according to a plurality of pronunciation similarity criteria, each of the similar sound tables indicating one or more similar sounds similar in pronunciation to one key sound for each of a plurality of key sounds;

regular expression storing means for storing a plurality of sets respectively composed of a regular expression and an applicable range prepared according to each of the pronunciation similarity criteria, each of the regular expressions indicating one or more strings of derivation types, each of derivation types indicating how each of a plurality of derived sounds placed at positions of an expanded pronunciation character string is derived from a remarked sound placed at a remarked position of a remarked pronunciation character string, and the number of sounds in the remarked pronunciation character string being within a corresponding applicable range;

question pronunciation character string receiving means for receiving a question pronunciation character string;

derivation element producing means for producing a set of derivation elements for the question pronunciation character string received by the derivation element producing means according to the similar sound tables stored in the similar sound table storing means and the regular expressions stored in the regular expression storing means, producing a set of regular expression elements from the regular expressions and the applicable ranges stored in the regular expression storing means and outputting the set of derivation elements, each of the derivation elements in the set being composed of a derived sound derived from one of a plurality of sounds in the question pronunciation character string, a sound position of the derived sound in each of one or more expanded pronunciation character strings expanded from the question pronunciation character string and a list of one or more derivation types respectively used to derive the derived sound at the sound position of each expanded pronunciation character string, the derivation types being extracted from the strings of derivation types indicated by the regular expressions prepared, each of the regular expression elements being composed of one regular expression and an applicable sound number and being produced from one regular expression and one applicable range prepared according to one of the pronunciation similarity criteria and the number of sounds in the question pronunciation character string, and the applicable sound number indicating the number of sounds in each of one or more expanded pronunciation character strings expanded from the question pronunciation character string; and finite state automaton producing means for producing a finite state automaton indicating one or more applicable strings of derivation types from the set of regular expression elements produced by the derivation element producing means and outputting the finite state automaton to expand one or more expanded pronunciation character strings as one or more similar pronunciation character strings similar in pronunciation to the question pronunciation character string according to the set of derivation elements output by the derivation element producing means and the finite state automaton, each applicable string of derivation types being indicated by one regular expression of one regular expression element on condition that the number of sounds in an expanded pronunciation character string expanded from the question pronunciation character string according to the applicable string of derivation types agrees with one applicable sound number of the regular expression element.

13. A similar character string expanding apparatus according to claim 12, in which each of the derivation types stored in the regular expression storing means is composed of a first symbol identifying one of the similar sound tables, a second symbol specifying a positional difference between a remarked position of one remarked sound placed in the remarked pronunciation character string and a derived position of one derived sound which is looked up in the similar sound table identified by the first symbol by using the remarked sound as one key sound and is placed in the expanded pronunciation character string and a third symbol indicating a derivation constraint for the remarked sound.

14. A similar character string expanding apparatus according to claim 12, in which the similar sound tables stored in the similar sound table storing means are classified into a same sound table indicating a sound which is the same as one key sound as a similar sound for each of the key sounds, a weak sound table indicating one or more weak sounds which is the same as or similar to one key sound as one or more similar sounds for each of the key sounds, a weak different sound table indicating one or more weak sounds similar in pronunciation to one key sound as one or more similar sounds for each of the key sounds, and a same-line sound table indicating a plurality of sounds, which are placed in the same line as that of one key sound, as a plurality of similar sounds for each of the key sounds.

15. A similar character string expanding method according to claim 13, in which the judgement whether or not a remarked sound in the question pronunciation character string satisfies one derivation constraint of one derivation type is performed according to a plurality of sounds in the question pronunciation character string regardless of any expanded pronunciation character string.

16. A similar character string expanding apparatus according to claim 12, further comprising:

derivation type producing means for producing a plurality of derivation types, each of the derivation types in the set of derivation elements produced by the derivation element producing means being supplied from the derivation type producing means.

17. A similar character string expanding apparatus according to claim 12, further comprising:

derivation type list number producing means for producing a plurality of derivation type list numbers to indicate one or more derivation type lists respectively composed of the same group of derivation types in the set of derivation elements produced by the derivation element producing means by the same derivation type list number, each of the applicable strings of derivation types indicated by the finite state automaton produced by the finite state automaton producing means being indicated by a string of derivation type list numbers.

18. A similar character string expanding apparatus according to claim 12, in which the derivation elements in the set of derivation elements are produced by the derivation element producing means in the order in which the number of the sound position is increased.

19. A similar character string expanding apparatus according to claim 12, in which a remarked position of a remarked sound in the question pronunciation character string is indicated by a relative position to a sound position of a derived sound in an expanded pronunciation character string by the derivation element producing means to determine a derivation element relating to the sound position.

20. A character string retrieving method for retrieving one or more registered character strings similar in pronunciation to a question pronunciation character string according to one or more pronunciation similarity criteria, comprising the steps of:

preparing a set of derivation elements, each of the derivation elements in the set being composed of a derived sound derived from one of a plurality of sounds in the question pronunciation character string, a sound position of the derived sound in each of the registered character strings and a derivation type indicating both the derivation of the derived sound from a remarked sound placed at a remarked position in the question pronunciation character string and a positional difference between the sound position and the remarked position;

preparing a finite state automaton indicating one or more groups of applicable strings of derivation types and one or more applicable sound numbers, each of the applicable strings of derivation types in one group being obtained from one of the pronunciation similarity criteria, and each of the applicable sound numbers denoting the limitation for one or more character strings derived from the applicable strings of derivation types in one group;

producing a plurality of possible strings of derivation types, respectively obtained by arranging one or more derivation types of one or more derivation elements extracted from the set of derivation elements in order of the sound position, as all candidates for the registered character strings;

judging whether or not each of the possible strings of derivation types agrees with one of the applicable strings of derivation types in the groups;

extracting one or more possible strings of derivation types respectively agreeing with one of the applicable strings of derivation types as one or more probable strings of derivation types;

judging whether or not each of probable character strings, respectively obtained by arranging one or more derived sounds relating to one or more derivation types of one probable string in order of the sound position, satisfies one corresponding applicable sound number;

extracting one or more probable strings of derivation types, which correspond to one or more probable character strings respectively satisfying the corresponding applicable sound number, as one or more definite strings of derivation types;

arranging one or more derived sounds corresponding to one or more derivation types of each definite string in order of the sound position to produce one or more definite character strings for the definite strings; and retrieving one or more character strings which each agree with one of the definite character strings and are registered in a data base, from the data base as the registered character strings.

21. A character string retrieving method according to claim 20 in which the step of retrieving one or more character strings comprises the steps of:

preparing the data base in which a plurality of character strings respectively corresponding to a character string number;

annexing a pronunciation number to each of the character strings stored in the data base in a retrieval structure form;

relating each of the pronunciation numbers to one or more character string numbers;

selecting one or more particular pronunciation numbers annexed to one or more character strings, which each agree with one of the definite character strings and are stored in the data base, from the pronunciation numbers;

selecting one or more particular character string numbers relating to the particular pronunciation numbers;

setting a plurality of particular character string numbers overlapped with each other to one character string number; and outputting the particular character string numbers which are not overlapped with each other and correspond to the definite character strings.

22. A character string retrieving method according to claim 20 in which the step of producing a plurality of possible strings comprises the steps of:

selecting one particular derivation element from one or more derivation elements corresponding to each of the sound positions;

arranging one or more particular derivation types of one or more particular derivation elements while adding the particular derivation types one by one in order of the sound position until one particular derivation type corresponding to a maximum sound position is arranged;

producing a possible string of derivation types each time one particular derivation type is arranged;

replacing a final particular derivation type, which is finally arranged and corresponds to the maximum sound position, with another derivation type corresponding to the maximum sound position to produce another possible string of derivation types each time the final particular derivation type is replaced with another derivation type;

reducing the maximum sound position by one each time all derivation types corresponding to the maximum sound position are arranged to produce one or more possible strings of derivation types;

adding another particular derivation type corresponding to the maximum sound position newly defined to produce another possible string of derivation types; and stopping the production of the possible strings of derivation types when all derivation types corresponding to a first sound position are arranged to produce one or more possible strings of derivation types.

23. A character string retrieving apparatus for retrieving one or more registered character strings similar in pronunciation to a question pronunciation character string according to one or more pronunciation similarity criteria, comprising:

derivation element set storing means for storing a set of derivation elements, each of the derivation elements in the set being composed of a derived sound derived from one of a plurality of sounds in the question pronunciation character string, a sound position of the derived sound in each of the registered character strings and a derivation type indicating both the derivation of the derived sound from a remarked sound placed at a remarked position in the question pronunciation character string and a positional difference between the sound position and the remarked position;

finite state automaton storing means for storing a finite state automaton indicating one or more groups of applicable strings of derivation types and one or more applicable sound numbers, each of the applicable strings of derivation types in one group being obtained from one of the pronunciation similarity criteria, and each of the applicable sound numbers denoting the limitation for one or more character strings derived from the applicable strings of derivation types in one group;

derivation type string producing means for producing a plurality of possible strings of derivation types, respectively obtained by arranging one or more derivation types of one or more derivation elements extracted from the set of derivation elements stored in the derivation element set storing means in order of the sound position, as all candidates for the registered character strings;

derivation type string judging means for judging whether or not each of the possible strings of derivation types produced by the derivation type string producing means agrees with one of the applicable strings of derivation types in the groups which are indicated by the finite state automaton stored in the finite state automaton storing means, extracting one or more possible strings of derivation types respectively agreeing with one of the applicable strings of derivation types as one or more probable strings of derivation types, judging whether or not each of probable character strings, respectively obtained by arranging one or more derived sounds relating to one or more derivation types of one probable string in order of the sound position, satisfies one corresponding applicable sound number which are indicated by the finite state automaton stored in the finite state automaton storing means, and extracting one or more probable strings of derivation types, which correspond to one or more probable character strings respectively satisfying the corresponding applicable sound number, as one or more definite strings of derivation types; and character string retrieving means for arranging one or more derived sounds corresponding to one or more derivation types of each definite string extracted by the derivation type string judging means in order of the sound position to produce one or more definite character strings for the definite strings and retrieving one or more character strings which each agree with one of the definite character strings and are registered in a data base, from the data base as the registered character strings.

24. A character string retrieving apparatus according to claim 23 in which the character string retrieving means comprises:

pronunciation index storing means for storing a pronunciation index in which a pronunciation number is annexed to each of the character strings stored in the data base in a retrieval structure form;

character string number list storing means for storing a character string number list in which a plurality of character string numbers, corresponding to the character strings stored in the data base, are made relation to a plurality of pronunciation numbers;

character string number retrieving means for retrieving one or more particular pronunciation numbers annexed to the definite character strings from the pronunciation index stored in the pronunciation index storing means and retrieving one or more particular character string numbers relating to the particular pronunciation numbers from the character string number list stored in the character string number list storing means; and overlapped character string number removing means for removing a plurality of particular character string numbers overlapped with each other by setting the particular character string numbers overlapped with each other to one particular character string number and outputting the particular character string numbers which are not overlapped with each other and correspond to the definite character strings.

25. A similar character string expanding and retrieving method for retrieving one or more registered character strings similar in pronunciation to a question pronunciation character string according to one or more pronunciation similarity criteria, comprising the steps of:

preparing one or more similar sound tables according to the pronunciation similarity criteria, each of the similar sound tables indicating one or more similar sounds similar in pronunciation to one key sound for each of a plurality of key sounds;

preparing a regular expression and an applicable range according to each of the pronunciation similarity criteria, each of the regular expressions indicating one or more strings of derivation types, each of derivation types indicating how each of a plurality of derived sounds placed at positions of an expanded pronunciation character string is derived from a remarked sound placed at a remarked position of a remarked pronunciation character string, and the number of sounds in the remarked pronunciation character string being within a corresponding applicable range;

receiving the question pronunciation character string;

producing a set of derivation elements for the question pronunciation character string according to the similar sound tables, the applicable ranges and the regular expressions corresponding to the pronunciation similarity criteria, each of the derivation elements in the set being composed of a derived sound derived from one of a plurality of sounds in the question pronunciation character string, a sound position of the derived sound in each of one or more expanded pronunciation character strings expanded from the question pronunciation character string and a derivation type used to derive the derived sound at the sound position of each expanded pronunciation character string, and the derivation types of the derivation elements being extracted from the strings of derivation types indicated by each of the regular expressions prepared;

selecting one or more particular regular expressions from the regular expressions, the number of sounds in the question pronunciation character string being within each of one or more applicable ranges corresponding to the particular regular expressions;

determining an applicable sound number indicating the number of sounds in each of one or more expanded pronunciation character strings expanded from the question pronunciation character string according to one particular regular expression by using the question pronunciation character string and the particular regular expression;

producing a group of a plurality of regular expression elements respectively composed of one particular regular expression and one applicable sound number corresponding to the particular regular expression;

producing a finite state automaton indicating one or more groups of applicable strings of derivation types and one or more applicable sound numbers from the group of regular expression elements, each group of applicable strings of derivation types being indicated according to one particular regular expression of one regular expression element, and each of the applicable sound numbers denoting the limitation for one or more character strings derived from the applicable strings of derivation types in one corresponding group;

producing a plurality of possible strings of derivation types, respectively obtained by arranging one or more derivation types of one or more derivation elements extracted from the set of derivation elements in order of the sound position;

judging whether or not each of the possible strings of derivation types agrees with one of the applicable strings of derivation types in the groups;

extracting one or more possible strings of derivation types respectively agreeing with one of the applicable strings of derivation types as one or more probable strings of derivation types;

judging whether or not each of probable character strings, respectively obtained by arranging one or more derived sounds relating to one or more derivation types of one probable string in order of the sound position, satisfies one corresponding applicable sound number;

extracting one or more probable strings of derivation types, which correspond to one or more probable character strings respectively satisfying the corresponding applicable sound number, as one or more definite strings of derivation types;

arranging one or more derived sounds corresponding to one or more derivation types of each definite string in order of the sound position to produce one or more definite character strings for the definite strings; and retrieving one or more character strings which each agree with one of the definite character strings and are registered in a data base, from the data base as the registered character strings.

26. A similar character string expanding and retrieving method according to claim 25, in which the step of preparing a regular expression and an applicable range includes the step of:

making up each of the derivation types of a first symbol identifying one of the similar sound tables, a second symbol specifying a positional difference between a remarked position of one remarked sound placed in the remarked pronunciation character string and a derived position of one derived sound which is looked up in the similar sound table identified by the first symbol by using the remarked sound as one key sound and is placed in the expanded pronunciation character string, and a third symbol indicating a derivation constraint for the remarked sound.

27. A similar character string expanding method according to claim 26, in which the step of producing a set of derivation elements comprises the steps of:

extracting a derivation type from a string of derivation types indicated by one of the regular expressions;

selecting a remarked sound from among a plurality of sounds in the question pronunciation character string;

judging whether or not the remarked sound satisfies a derivation constraint of the derivation type;

determining a sound position according to a remarked position of the remarked sound in the question pronunciation character string and a positional difference of the derivation type in cases where the remarked sound satisfies the derivation constraint;

looking up one or more similar sounds in a similar sound table identified by an identifying symbol of the derivation type by using the remarked sound as a key sound;

determining each of the similar sounds as a derived sound in cases where the remarked sound satisfies the derivation constraint;

producing a derivation element composed of the sound position, the derivation type and the derived sound; and registering the derivation element in the set of derivation elements.

28. A similar character string expanding and retrieving method according to claim 26, in which the step of making up each of the derivation types include the step of:

judging whether or not a remarked sound in the question pronunciation character string satisfies a derivation constraint of a derivation type according to a plurality of sounds in the question pronunciation character string regardless of any expanded pronunciation character string.

29. A similar character string expanding and retrieving method according to claim 25, in which the step of preparing one or more similar sound tables includes the steps of;

preparing a same sound table indicating a sound which is the same as one key sound as a similar sound for each of the key sounds;

preparing a weak sound table indicating one or more weak sounds which is the same as or similar to one key sound as one or more similar sounds for each of the key sounds;

preparing a weak different sound table indicating one or more weak sounds similar in pronunciation to one key sound as one or more similar sounds for each of the key sounds; and preparing a same-line sound table indicating a plurality of sounds, which are placed in the same line as that of one key sound, as a plurality of similar sounds for each of the key sounds.

30. A similar character string expanding and retrieving method according to claim 25 in which the step of retrieving one or more character strings comprises the steps of:

preparing the data base in which a plurality of character strings respectively corresponding to a character string number;

annexing a pronunciation number to each of the character strings stored in the data base in a retrieval structure form;

relating each of the pronunciation numbers to one or more character string numbers;

selecting one or more particular pronunciation numbers annexed to one or more character strings, which each agree with one of the definite character strings and are stored in the data base, from the pronunciation numbers;

selecting one or more particular character string numbers relating to the particular pronunciation numbers; setting a plurality of particular character string numbers overlapped with each other to one character string number; and outputting the particular character string numbers which are not overlapped with each other and correspond to the definite character strings.

31. A similar character string expanding and retrieving method according to claim 25 in which the step of producing a plurality of possible strings comprises the steps of:

selecting one particular derivation element from one or more derivation elements corresponding to each of the sound positions;

arranging one or more particular derivation types of one or more particular derivation elements while adding the particular derivation types one by one in order of the sound position until one particular derivation type corresponding to a maximum sound position is arranged;

producing a possible string of derivation types each time one particular derivation type is arranged;

replacing a final particular derivation type, which is finally arranged and corresponds to the maximum sound position, with another derivation type corresponding to the maximum sound position to produce another possible string of derivation types each time the final particular derivation type is replaced with another derivation type;

reducing the maximum sound position by one each time all derivation types corresponding to the maximum sound position are arranged to produce one or more possible strings of derivation types;

adding another particular derivation type corresponding to the maximum sound position newly defined to produce another possible string of derivation types; and stopping the production of the possible strings of derivation types when all derivation types corresponding to a first sound position are arranged to produce one or more possible strings of derivation types.

32. A similar character string expanding and retrieving apparatus for retrieving one or more registered character strings similar in pronunciation to a question pronunciation character string according to one or more pronunciation similarity criteria, comprising:

similar sound table storing means for storing one or more similar sound tables prepared according to a plurality of pronunciation similarity criteria, each of the similar sound tables indicating one or more similar sounds similar in pronunciation to one key sound for each of a plurality of key sounds;

regular expression storing means for storing a plurality of sets respectively composed of a regular expression and an applicable range prepared according to each of the pronunciation similarity criteria, each of the regular expressions indicating one or more strings of derivation types, each of derivation types indicating how each of a plurality of derived sounds placed at positions of an expanded pronunciation character string is derived from a remarked sound placed at a remarked position of a remarked pronunciation character string, and the number of sounds in the remarked pronunciation character string being within a corresponding applicable range;

question pronunciation character string receiving means for receiving a question pronunciation character string;

derivation element producing means for producing a set of derivation elements for the question pronunciation character string received by the derivation element producing means according to the similar sound tables stored in the similar sound table storing means and the regular expressions stored in the regular expression storing means, selecting one or more particular regular expressions from the regular expressions stored in the regular expression storing means on condition that the number of sounds in the question pronunciation character string is within each of one or more applicable ranges corresponding to the particular regular expressions, determining an applicable sound number indicating the number of sounds in each of one or more expanded pronunciation character strings expanded from the question pronunciation character string received according to one particular regular expression by using the question pronunciation character string received by the question pronunciation character string receiving means and the particular regular expression, producing a group of a plurality of regular expression elements respectively composed of one particular regular expression and one applicable sound number corresponding to the particular regular expression, each of the derivation elements in the set being composed of a derived sound derived from one of a plurality of sounds in the question pronunciation character string, a sound position of the derived sound in each of one or more expanded pronunciation character strings expanded from the question pronunciation character string and a derivation type used to derive the derived sound at the sound position of each expanded pronunciation character string, and the derivation types of the derivation elements being extracted from the strings of derivation types indicated by the regular expressions;

finite state automaton producing means for producing a finite state automaton indicating one or more applicable strings of derivation types from the set of regular expression elements produced by the derivation element producing means, each applicable string of derivation types being indicated by one particular regular expression of one regular expression element on condition that the number of sounds in an expanded pronunciation character string expanded from the question pronunciation character string according to the applicable string of derivation types agrees with one applicable sound number of the regular expression element;

derivation type string producing means for producing a plurality of possible strings of derivation types, respectively obtained by arranging one or more derivation types of one or more derivation elements extracted from the set of derivation elements produced by the derivation element producing means in order of the sound position;

derivation type string judging means for judging whether or not each of the possible strings of derivation types produced by the derivation type string producing means agrees with one of the applicable strings of derivation types in the groups which are indicated by the finite state automaton produced by the finite state automaton producing means, extracting one or more possible strings of derivation types respectively agreeing with one of the applicable strings of derivation types as one or more probable strings of derivation types, judging whether or not each of probable character strings, respectively obtained by arranging one or more derived sounds relating to one or more derivation types of one probable string in order of the sound position, satisfies one corresponding applicable sound number which are indicated by the finite state automaton stored in the finite state automaton storing means, and extracting one or more probable strings of derivation types, which correspond to one or more probable character strings respectively satisfying the corresponding applicable sound number, as one or more definite strings of derivation types; and character string retrieving means for arranging one or more derived sounds corresponding to one or more derivation types of each definite string extracted by the derivation type string judging means in order of the sound position to produce one or more definite character strings for the definite strings and retrieving one or more character strings which each agree with one of the definite character strings and are registered in a data base, from the data base as the registered character strings.

33. A similar character string expanding and retrieving apparatus according to claim 32, in which each of the derivation types stored in the regular expression storing means is composed of a first symbol identifying one of the similar sound tables, a second symbol specifying a positional difference between a remarked position of one remarked sound placed in the remarked pronunciation character string and a derived position of one derived sound which is looked up in the similar sound table identified by the first symbol by using the remarked sound as one key sound and is placed in the expanded pronunciation character string, and a third symbol indicating a derivation constraint for the remarked sound.

34. A similar character string expanding and retrieving apparatus according to claim 33, in which the judgement whether or not a remarked sound in the question pronunciation character string satisfies one derivation constraint of one derivation type is performed according to a plurality of sounds in the question pronunciation character string regardless of any expanded pronunciation character string.

35. A similar character string expanding and retrieving apparatus according to claim 32, in which the similar sound tables stored in the similar sound table storing means are classified into a same sound table indicating a sound which is the same as one key sound as a similar sound for each of the key sounds, a weak sound table indicating one or more weak sounds which is the same as or similar to one key sound as one or more similar sounds for each of the key sounds, a weak different sound table indicating one or more weak sounds similar in pronunciation to one key sound as one or more similar sounds for each of the key sounds, and a same-line sound table indicating a plurality of sounds, which are placed in the same line as that of one key sound, as a plurality of similar sounds for each of the key sounds.

36. A similar character string expanding and retrieving apparatus according to claim 32, in which the character string retrieving means comprises:

pronunciation index storing means for storing a pronunciation index in which a pronunciation number is annexed to each of the character strings stored in the data base in a retrieval structure form;

character string number list storing means for storing a character string number list in which a plurality of character string numbers, corresponding to the character strings stored in the data base, are made relation to a plurality of pronunciation numbers;

character string number retrieving means for retrieving one or more particular pronunciation numbers annexed to the definite character strings from the pronunciation index stored in the pronunciation index storing means and retrieving one or more particular character string numbers relating to the particular pronunciation numbers from the character string number list stored in the character string number list storing means; and overlapped character string number removing means for removing a plurality of particular character string numbers overlapped with each other by setting the particular character string numbers overlapped with each other to one particular character string number and outputting the particular character string numbers which are not overlapped with each other and correspond to the definite character strings.

\* \* \* \* \*